United States Patent
Hovland et al.

(10) Patent No.: US 10,460,484 B2
(45) Date of Patent: Oct. 29, 2019

(54) SYSTEMS AND ASSOCIATED METHODS FOR ROUTE GENERATION AND MODIFICATION

(71) Applicant: NAVICO HOLDING AS, Egersund (NO)

(72) Inventors: Eirik Hovland, Egersund (NO); Mark Harnett, Auckland (NZ)

(73) Assignee: NAVICO HOLDING AS, Egersund (NO)

(*) Notice: Subject to any disclaimer, the term of this patent is extended or adjusted under 35 U.S.C. 154(b) by 406 days.

(21) Appl. No.: 15/192,339

(22) Filed: Jun. 24, 2016

(65) Prior Publication Data

US 2017/0370724 A1     Dec. 28, 2017

(51) Int. Cl.
| | |
|---|---|
| *G06F 3/048* | (2013.01) |
| *G06T 11/20* | (2006.01) |
| *G01C 21/20* | (2006.01) |
| *B63B 49/00* | (2006.01) |

(52) U.S. Cl.
CPC ............ *G06T 11/206* (2013.01); *B63B 49/00* (2013.01); *G01C 21/203* (2013.01)

(58) Field of Classification Search
None
See application file for complete search history.

(56) References Cited

U.S. PATENT DOCUMENTS

| | | |
|---|---|---|
| 4,614,900 A | 9/1986 | Young |
| 4,824,408 A | 4/1989 | Aertker et al. |
| 4,829,493 A | 5/1989 | Bailey |
| 4,879,697 A | 11/1989 | Lowrance et al. |
| 4,888,699 A | 12/1989 | Knoll et al. |
| 5,025,423 A | 6/1991 | Earp |
| 5,172,324 A | 12/1992 | Knight |
| 5,191,341 A | 3/1993 | Gouard et al. |
| 5,202,835 A | 4/1993 | Knight |
| 5,268,844 A | 12/1993 | Carver et al. |

(Continued)

FOREIGN PATENT DOCUMENTS

| | | |
|---|---|---|
| EP | 1033584 A2 | 9/2000 |
| EP | 1772789 A1 | 4/2007 |

OTHER PUBLICATIONS

PCT International Search Report and Written Opinion; PCT/IB2013/060285; Feb. 18, 2014.

(Continued)

*Primary Examiner* — Claudia Dragoescu
(74) *Attorney, Agent, or Firm* — Nelson Mullins Riley & Scarborough LLP

(57) ABSTRACT

A touch screen may be utilized by a marine electronic device to easily enter a route in relation to a chart. The marine electronic device may automatically determine and join geographic points associated with the chart to generate a route based on a touch pattern. The marine electronic device may be configured to complete the route to form a route loop in instances in which the start and end of the touch pattern are within a predetermined distance. The completion of the route may be accomplished by connecting the end point to the start point or by "snapping" the end point to the start point, e.g. shifting the end point to the start point. Additionally or alternatively, a user may use pre-determined route snippets to quickly and easily alter a route.

14 Claims, 14 Drawing Sheets

(56) References Cited

U.S. PATENT DOCUMENTS

| | | | |
|---|---|---|---|
| 5,386,368 A | 1/1995 | Knight | |
| 5,491,636 A | 3/1996 | Robertson et al. | |
| 5,523,951 A | 6/1996 | Kriegsman et al. | |
| 5,537,380 A | 7/1996 | Sprankle, Jr. et al. | |
| 5,606,930 A | 3/1997 | LeBlanc et al. | |
| 5,646,856 A | 7/1997 | Kaesser | |
| 5,754,430 A | 5/1998 | Sawada | |
| 5,832,440 A | 11/1998 | Woodbridge et al. | |
| 5,859,517 A | 1/1999 | DePasqua | |
| 5,884,213 A | 3/1999 | Carlson | |
| 6,225,984 B1 | 5/2001 | Crawford | |
| 6,266,611 B1 | 7/2001 | Matsubayashi | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,633,810 B1 | 10/2003 | Qureshi et al. | |
| 6,761,692 B2 | 7/2004 | Angelsen et al. | |
| 6,816,782 B1 | 11/2004 | Walters et al. | |
| 6,904,341 B2 | 6/2005 | Kish et al. | |
| 7,002,579 B2 | 2/2006 | Olson | |
| 7,236,426 B2 | 6/2007 | Turner et al. | |
| 7,268,703 B1 | 9/2007 | Kabel et al. | |
| 7,430,461 B1 | 9/2008 | Michaels | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,380,366 B1 | 2/2013 | Schulte et al. | |
| 2002/0035574 A1 | 3/2002 | Dumas | |
| 2002/0093541 A1 | 7/2002 | Schileru-Key | |
| 2002/0177944 A1 | 11/2002 | Ihara et al. | |
| 2004/0181337 A1 | 9/2004 | Kawasaki et al. | |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0089794 A1* | 4/2006 | DePasqua | G01C 21/203 701/532 |
| 2006/0119585 A1 | 6/2006 | Skinner | |
| 2006/0224940 A1 | 10/2006 | Lee | |
| 2007/0162207 A1 | 7/2007 | Shimo et al. | |
| 2008/0126935 A1 | 5/2008 | Blomgren | |
| 2008/0133131 A1 | 6/2008 | Poreda | |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0249247 A1 | 10/2009 | Tseng et al. | |
| 2009/0251366 A1 | 10/2009 | McClure et al. | |
| 2009/0287409 A1 | 11/2009 | Summers | |
| 2010/0080082 A1 | 4/2010 | Betts et al. | |
| 2010/0094548 A1 | 4/2010 | Tadman et al. | |
| 2010/0131133 A1* | 5/2010 | Koda | G05D 1/0206 701/21 |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0029238 A1* | 2/2011 | Lee | G01C 21/3407 701/414 |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2012/0290200 A1* | 11/2012 | Kabel | G01C 21/22 701/409 |
| 2013/0007665 A1 | 1/2013 | Chaudhri et al. | |
| 2014/0200806 A1* | 7/2014 | Carnevali | G01C 21/203 701/533 |
| 2015/0051836 A1 | 2/2015 | Langford-Wood | |
| 2016/0091324 A1* | 3/2016 | Horihata | G08G 1/0112 701/417 |
| 2016/0101838 A1* | 4/2016 | Kojima | B63B 49/00 701/21 |
| 2016/0123756 A1* | 5/2016 | Becker | G01C 21/3476 701/533 |

OTHER PUBLICATIONS

PCT International Search Report and Written Opinion; PCT/US2013/047869; dated Oct. 21, 2013.
PCT International Search Report and Written Opinion; PCT/US2013/048177; dated Oct. 21, 2013.
PCT International Search Report and Written Opinion; PCT/US2013/048129; dated Oct. 17, 2013.
PCT International Search Report and Written Opinion; PCT/US2013/047926; dated Oct. 11, 2013.
PCT International Search Report and Written Opinion; PCT/US2013/047645; dated Sep. 27, 2013.
PCT International Search Report and Written Opinion; PCT/IB2014/063905; dated Jan. 30, 2015.
Voyages; Wessex Archeology; Jul. 5, 2008; http://www.wessexarch.co.uk/projects/marine/alsf/englands_shipping/data/voyages.html.
dKart Software Presentation; Morintech; 2004; http://www.ramona.es/us/downloads/dKart_Functions_2004.ppt.
Furuno NavPilot 711 Product Detail Website visited Aug. 18, 2016 http://www.furunousa.com/Products/ProductDetail.aspx?product=NAVPILOT+711.
"Chart Work—SAR Search Patterns." Chart Work, OpenCPN, n.d. Web. Oct. 21, 2012 <http://web.archive.org/web/20121023053142/http://opencpn.org/ocpn/node/196>.

* cited by examiner

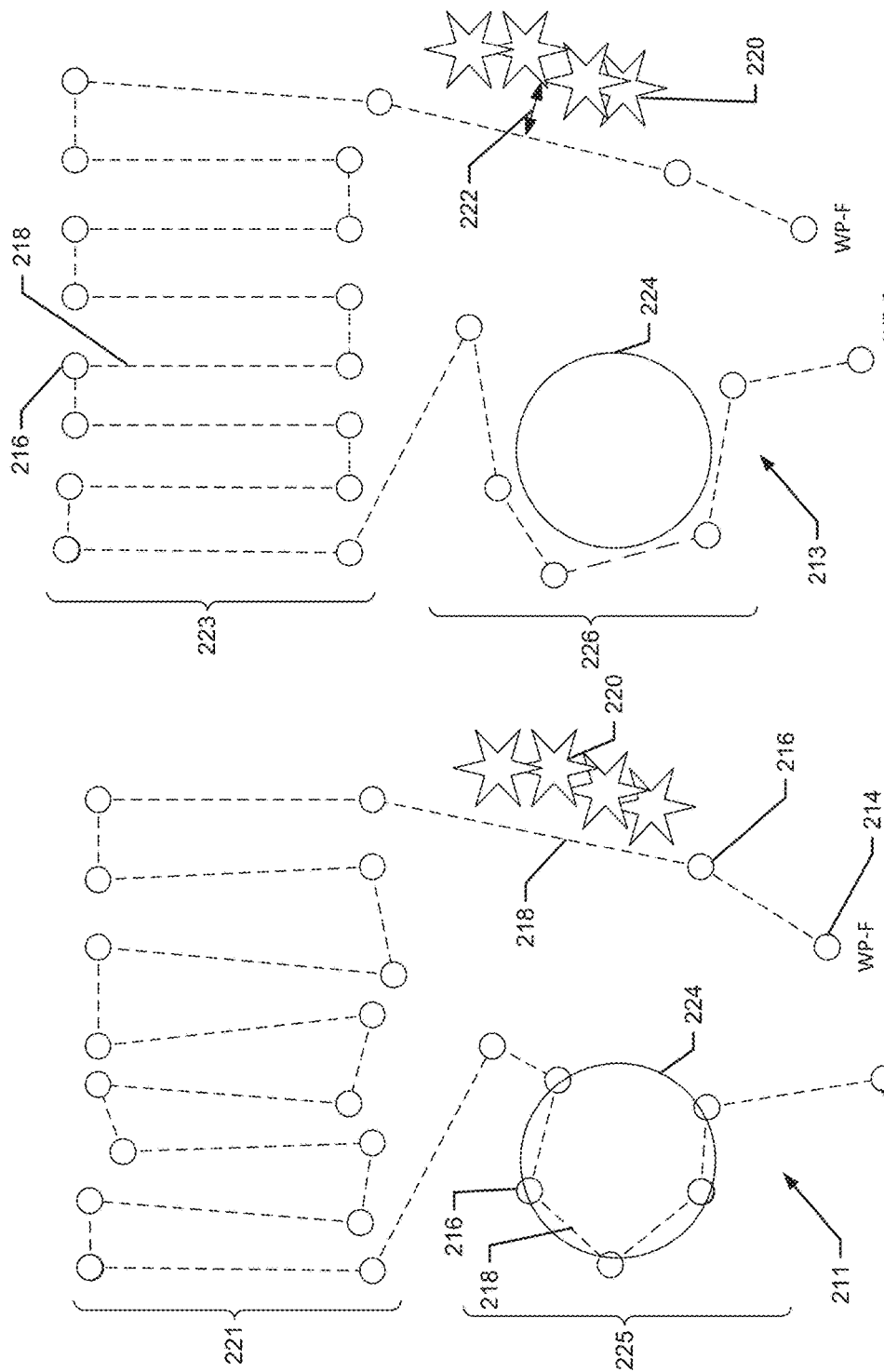

SYSTEMS AND ASSOCIATED METHODS FOR ROUTE GENERATION AND MODIFICATION

FIELD OF THE INVENTION

Embodiments of the present invention relate generally to navigation systems and, more particularly, to navigation systems, assemblies, and associated methods for generating and/or modifying a route.

BACKGROUND OF THE INVENTION

Navigational systems, such as marine navigational systems, may provide a display of a navigational chart or map. Routes are generally manually entered into the navigation system, for display in association with the chart, by a user. The route may be followed by manual maneuvering of the vehicle or by an autopilot system. In some instances, the navigational systems may also provide a location of the vehicle.

BRIEF SUMMARY OF THE INVENTION

Typically entering a route into a navigation system, particularly marine navigations systems may include multiple steps. For example, entering a route may include specifying each point on the route, joining each of the points, and then activating the route.

In some embodiments of the present invention, one or more touch screens of a marine electronic device may be utilized to easily enter a route in relation to a chart. The marine electronic device may automatically determine and join points to generate a route based on a touch pattern from the touch screen. The marine electronic device may be configured to complete the route to form a route loop in instances in which the start and end of the touch pattern are within a predetermined distance. The completion of the route may be accomplished by connecting the end point to the start point or by "snapping" the end point to the start point, e.g. shifting the end point to the position of the start point. The marine electronic device may also verify the route safety based on speed of the vehicle, depth, obstacles, land, or the like; and modify the route by shifting the locations of one or more points of the route to generate a safe route. Additionally, the marine electronic device may be configured to compare portions of the route to known route patterns and modify the portions of the route based on the known patterns, such as search and rescue patterns, fishing patterns, survey patterns, or the like.

In some navigational systems, once a route is entered and activated, changes to the route may be compacted. For example, changing the route may include deactivating the active route, entering each point of a new route, and then activating the new route. In some instances an autopilot may also be deactivated while changing the route.

In some example embodiments, a user may select a route snippet, e.g. a non-geographically referenced navigational maneuver, from a snippet library. Route snippets may be modified to fit a navigational situation, such as by rotation, scale change, or the like. Once the route snippet is appropriately shaped, the route snippet may be attached to the route and activated, with at least a corresponding portion of the route that is replaced being deactivated. The route snippets may allow for an efficient method to change the route to perform maneuvers, such as overtaking a vehicle, a Williamson maneuver, or the like. In an instance in which the route is utilized for an autopilot system, the route may be modified by the route snippet without disengaging the autopilot. Similar to the route generation discussed above, the marine electronic device may also verify the safety of the route snippet.

An example embodiment of the present invention includes a marine electronic device including a user interface comprising a touch screen, a processor, and a memory having computer program code stored thereon. The memory and the computer program code are configured to, with the processor, cause the marine electronic device to cause a chart to be displayed on the touch screen, receive, via the touch screen, user input defining a touch pattern directed to the chart, which defines a starting point and an ending point, and determine one or more geographic locations on the chart that each correspond to one or more points along the touch pattern including a starting location that corresponds to the starting point and an ending location that corresponds to the ending point. The memory and the computer program code are further configured to determine a distance between the starting location and the ending location and, in an instance in which the distance between the starting location and the ending location is within a completion threshold, generate a continuous route comprising the one or more determined geographic locations on the chart based on the touch pattern.

In an example embodiment of the marine electronic device, the starting location and ending location of the route are connected in response to the start location and ending location satisfying the predetermined completion threshold.

In some example embodiments of the marine electronic device, the ending location shifts to match the starting location in response to the starting location and ending location satisfying the predetermined completion threshold.

In an example embodiment of the marine electronic device, the memory and the computer program code are further configured to, with the processor, cause the marine electronic device to receive, via the user interface, an indication to activate the route and send, to an autopilot for a maneuvering system of a watercraft including the marine electronic device, instructions to cause the autopilot to operate the maneuvering system such that the watercraft travels along the route.

In some example embodiments of the marine electronic device, the memory and the computer program code are further configured to cause the marine electronic device to generate the route between a plurality of waypoints. Each waypoint corresponding to a determined geographic location that corresponds to a point along the touch pattern.

In an example embodiment of the marine electronic device, the memory and the computer program code are further configured to, with the processor, cause the marine electronic device to compare the route to one or more predetermined navigational thresholds, which are based on a speed of a vessel and turn radius associated with the speed of the vessel, and modify at least a portion of the route to generate a safe route which satisfies the predetermined navigational thresholds such that the route will not exceed a minimum safe turn radius. In some example embodiments of the marine electronic device, the safe route includes a plurality of waypoints and course headings and the distance between two consecutive waypoints of the plurality of waypoints is based on predetermined navigation thresholds.

In an example embodiment of the marine electronic device, the memory and the computer program code are further configured to, with the processor, cause the marine electronic device to compare the route to one or more predetermined navigational thresholds, which are based at least on one of obstacles, depth, and land, and modify at least a portion of the route to generate a safe route which satisfies the predetermined navigational thresholds such that a vessel avoids marine hazards along the route.

In some example embodiments of the marine electronic device, the memory and the computer program code are further configured to, with the processor, cause the marine electronic device to compare at least a portion of the route to a plurality of stored route patterns and update the portion of the route to reflect at least one of the plurality of stored route patterns in an instance in which the portion of the route matches the one of the plurality of stored route patterns within a route pattern threshold.

In an example embodiment of the marine electronic device, the memory and the computer program code are further configured to, with the processor, cause the electronic navigation device to receive a repeat route indication and cause the route to repeat for at least a plurality of cycles.

In some example embodiments of the marine electronic device, the memory and the computer program code are further configured to, with the processor, cause the electronic navigation device to receive an indication of a change to the route and update the route based on the indication of the change to the route. In an example embodiment of the marine electronic device, the indication of a change to the route includes receiving an indication of a selected route snippet, receiving an indication of a selected portion on the route, causing the route snippet to be displayed at the selected portion, and causing the route snippet to be activated and the selected portion to be deactivated. In some example embodiments of the marine electronic device, the route snippet is activated in response to an indication of route snippet activation from the user interface.

In another example embodiment a computer program product is provided including a non-transitory computer readable medium including computer program code configured to, with a processor, cause a marine electronic device to cause a chart to be displayed on a touch screen of a user interface, receive, via the touch screen, user input defining a touch pattern directed to the chart, the touch pattern defining a starting point and an ending point, and determine one or more geographic locations on the chart that each correspond to one or more points along the touch pattern including a starting location that corresponds to the starting point and an ending location that corresponds to the ending point. The computer program code is further configured to determine a distance between the starting location and the ending location and, in an instance in which the distance between the starting location and the ending location is within a completion threshold, generate a continuous route comprising the one or more determined geographic locations on the chart based on the touch pattern.

In a further example embodiment, a method is provided including causing a chart to be displayed on a touch screen of a user interface, receiving, via the touch screen, user input defining a touch pattern directed to the chart, the touch pattern defining a starting point and an ending point, and determining one or more geographic locations on the chart that each correspond to one or more points along the touch pattern including a starting location that corresponds to the starting point and an ending location that corresponds to the ending point. The method also includes determining a distance between the starting location and the ending location and, in an instance in which the distance between the starting location and the ending location is within a completion threshold, generating a continuous route comprising the one or more determined geographic locations on the chart based on the touch pattern.

In yet another example embodiment, a marine electronic device is provided including, a user interface comprising a screen, a processor, and a memory having computer program code stored thereon. The memory and the computer program code are configured to, with the processor, cause the marine electronic device to display a route on the screen, receive an indication of a desire to modify the route, display a plurality of route snippets indicators associated with a plurality of route snippets, each route snippet being a non-geographically referenced navigational maneuver, and receive, via the user interface, user input indicating selection of a route snippet from the plurality of route snippets. The memory and the computer program code are further configured to, with the processor, cause the marine electronic device to receive, via the user interface, user input indicating a selected position of the selected route snippet in connection with a point along the route, display the selected route snippet such that a beginning of the route snippet is connected to the point along the route, and cause modification of the route such that the selected route snippet is activated and a portion of the route following the point is deactivated.

In an example embodiment of the marine electronic device, the memory and the computer program code are further configured to, with the processor, cause the marine electronic device to receive user input defining a new route snippet via the user interface, the new route snippet including a plurality of waypoints and relative headings, and cause the new route snippet to be stored in the memory with the plurality of route snippets. In some example embodiments of the marine electronic device, the screen includes a touch screen and the indication of a new route snippet from the user interface includes a touch pattern.

In an example embodiment of the marine electronic device, the memory and the computer program code are further configured to, with the processor, cause the marine electronic device to receive an indication of change in scale associated with the route snippet and cause the scale of the route snippet to change relative to the route based on the indication of change in scale.

In some example embodiments of the marine electronic device, the memory and the computer program code are further configured to, with the processor, cause the marine electronic device to receive an indication of rotation in association with the route snippet and cause the route snippet to rotate relative to the route based on the indication of rotation.

In an example embodiment of the marine electronic device, the deactivated portion of the route is displayed in visual contrast to the active portion of the route and the active route snippet.

In some example embodiments of the marine electronic device, the route snippet includes a plurality of waypoints and the memory and the computer program code are further configured to, with the processor, cause the marine electronic device to receive an indication of change of position of a waypoint of the plurality of waypoints and update the route snippet based on the indication of change in position of the waypoint.

In an example embodiment of the marine electronic device, the memory and the computer program code are further configured to, with the processor, cause the marine electronic device to cause the route to be stored in the memory separate from the route snippet.

In some example embodiments of the marine electronic device, the memory and the computer program code are further configured to, with the processor, cause the marine electronic device to send, to an autopilot for a maneuvering system of a watercraft including the marine electronic device, instructions to cause the autopilot to operate the maneuvering system such that the watercraft travels along the modified route that includes the activated route snippet.

In an example embodiment of the marine electronic device, the route includes a marine navigational route and the route snippet includes a predetermined navigational maneuver.

In some example embodiments of the marine electronic device, the memory and the computer program code are further configured to, with the processor, cause the marine electronic device to compare the route snippet at the selected position to one or more predetermined navigational thresholds, which are based on at least one of a speed of a vehicle and navigation features, and cause notification of an unsafe route to be displayed on the user interface, which indicates at least a portion of the route snippet that fails to satisfy the predetermined navigational threshold.

In an example embodiment of the marine electronic device, the memory and the computer program code are further configured to, with the processor, cause the marine electronic device to compare the route snippet at the selected position to one or more predetermined navigational thresholds and modify the route snippet to generate a safe route snippet based on the route snippet and the predetermined navigational thresholds.

In some example embodiments of the marine electronic device, the memory and the computer program code are further configured to, with the processor, cause the marine electronic device to receive an indication of the route snippet being within a predetermined distance of the route and cause an indication of a snap position indicative of a current point on the route such that a currently selected portion of the route is indicated on the user interface in relation to a potential position for the route snippet. In an example embodiment of the marine electronic device, the indication of a snap position includes a snippet start position and a snippet end position. In some example embodiments of the marine electronic device, the screen includes a touch screen and the memory and the computer program code are further configured to, with the processor, cause the marine electronic device to display the route snippet at the selected position of the route by automatically displaying the route snippet at the snap position in response to receiving user input indicating a release of the route snippet from the touch screen.

In an example embodiment of the marine electronic device, the memory and the computer program code are further configured to, with the processor, cause the marine electronic device to display a vehicle location associated with the marine electronic device along the route.

In some example embodiments of the marine electronic device, the memory and the computer program code are further configured to, with the processor, cause the marine electronic device to display at least one of vehicles or navigational features within a currently displayed area associated with the route.

In an example embodiment of the marine electronic device, activation of the selected route snippet is in response to receiving, via the user interface, user input indicating a desire to activate the selected route snippet.

In still a further example embodiment, a computer program product is provided including a non-transitory computer readable medium including computer program code configured to, with a processor, cause a marine electronic device to display a route on a screen associated with a user interface, receive an indication of a desire to modify the route, display a plurality of route snippets, each route snippets being a non-geographically referenced navigational maneuver, and receive, via the user interface, user input indicating selection of a route snippet from the plurality of route snippets. The computer program code is also configured to, with a processor, cause a marine electronic device to receive, via the user interface, user input indicating a desired position of the selected route snippet in connection with a point along the route, display the selected route snippet such that a beginning of the route snippet is connected to the point along the route, and cause modification of the route such that the selected route snippet is activated and a portion of the route following the point is deactivated.

In yet another example embodiment, a method is provided including displaying a route on a screen associated with a user interface, receiving an indication of a desire to modify the route, displaying a plurality of route snippets, each route snippets being a non-geographically referenced navigational maneuver, and receiving, via the user interface, user input indicating selection of a route snippet from the plurality of route snippets. The method also includes receiving, via the user interface, user input indicating a desired position of the selected route snippet in connection with a point along the route, displaying the selected route snippet such that a beginning of the route snippet is connected to the point along the route, and causing modification of the route such that the selected route snippet is activated and a portion of the route following the point is deactivated.

Example marine electronic devices, computer program products, systems, and methods of the present invention may also include additional embodiments, such as described above with respect to the first and second example marine electronic devices.

BRIEF DESCRIPTION OF THE DRAWINGS

Figure 1A:
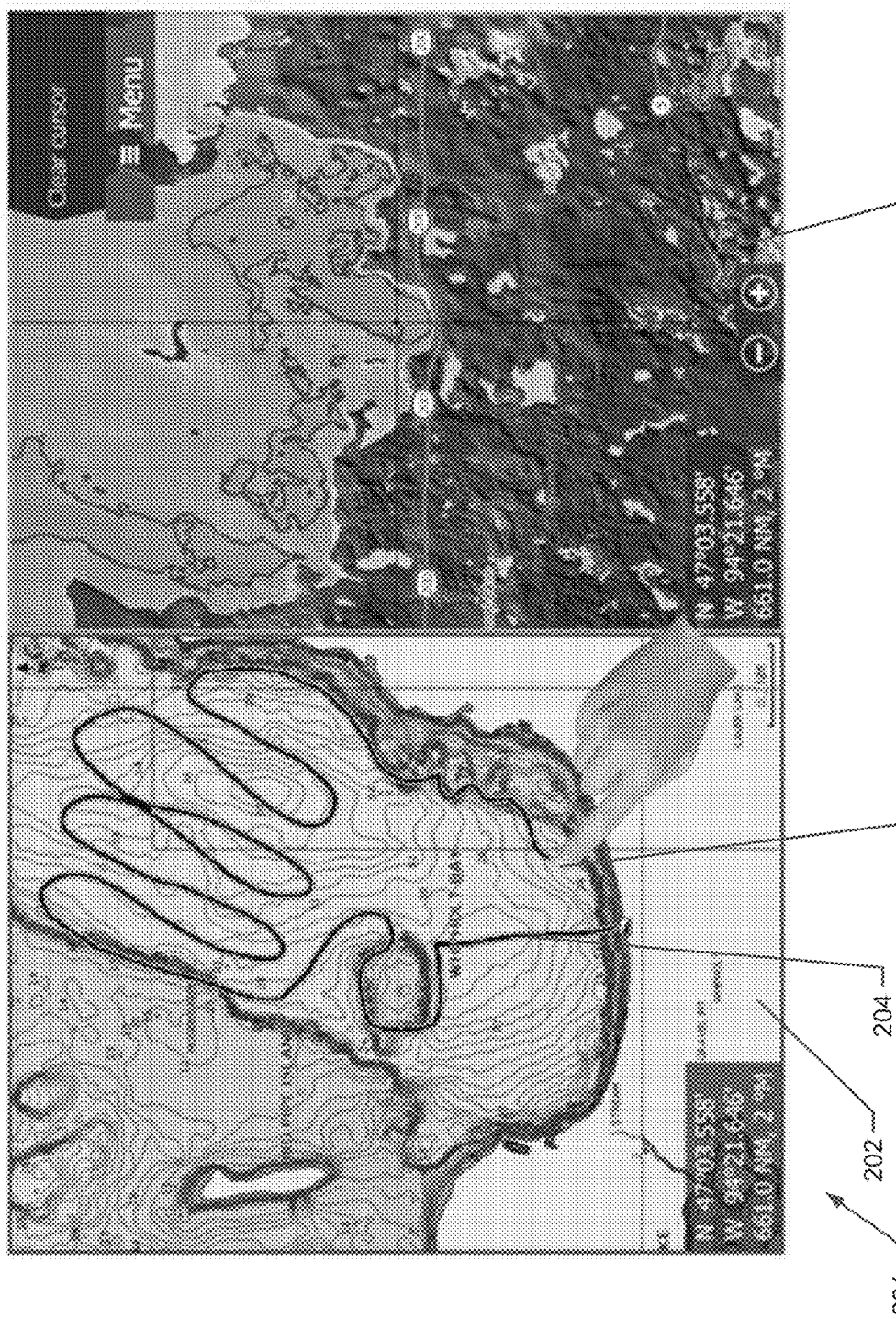
Figure 1B:
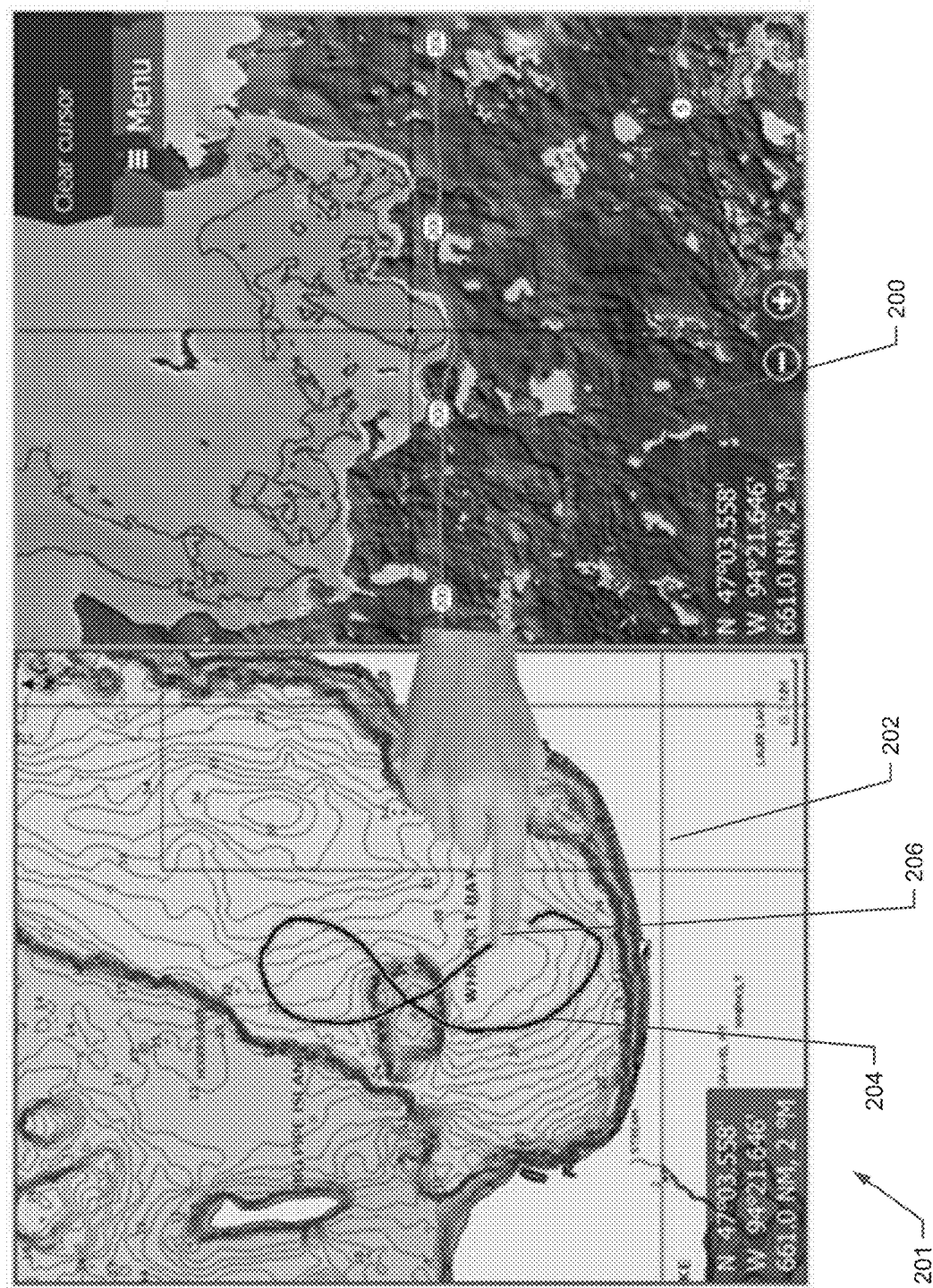
Figure 3:
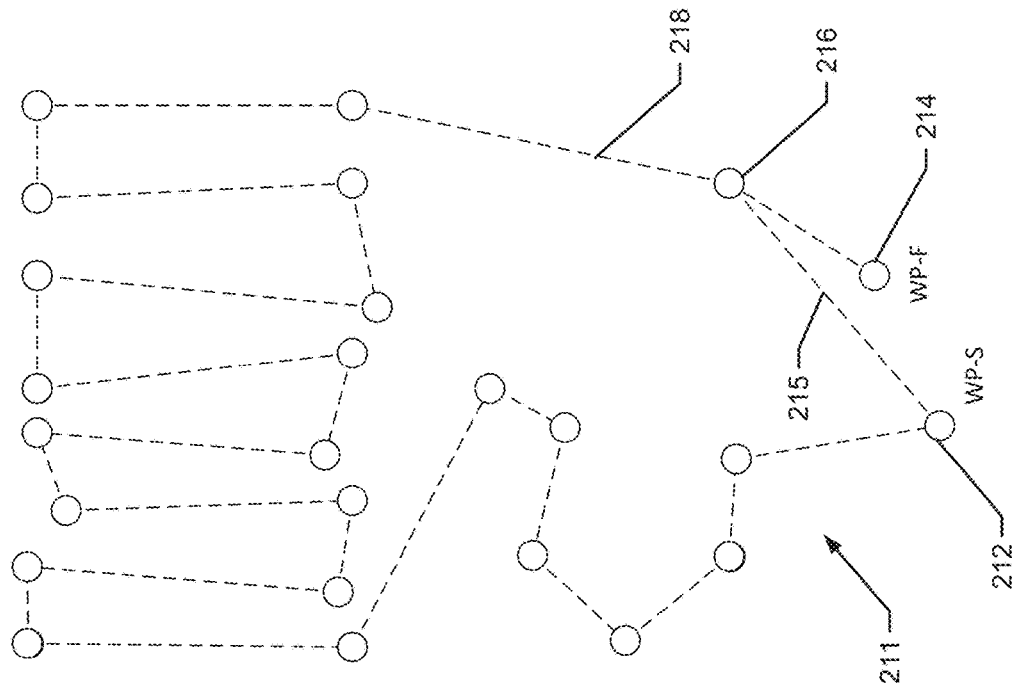
Figure 2:
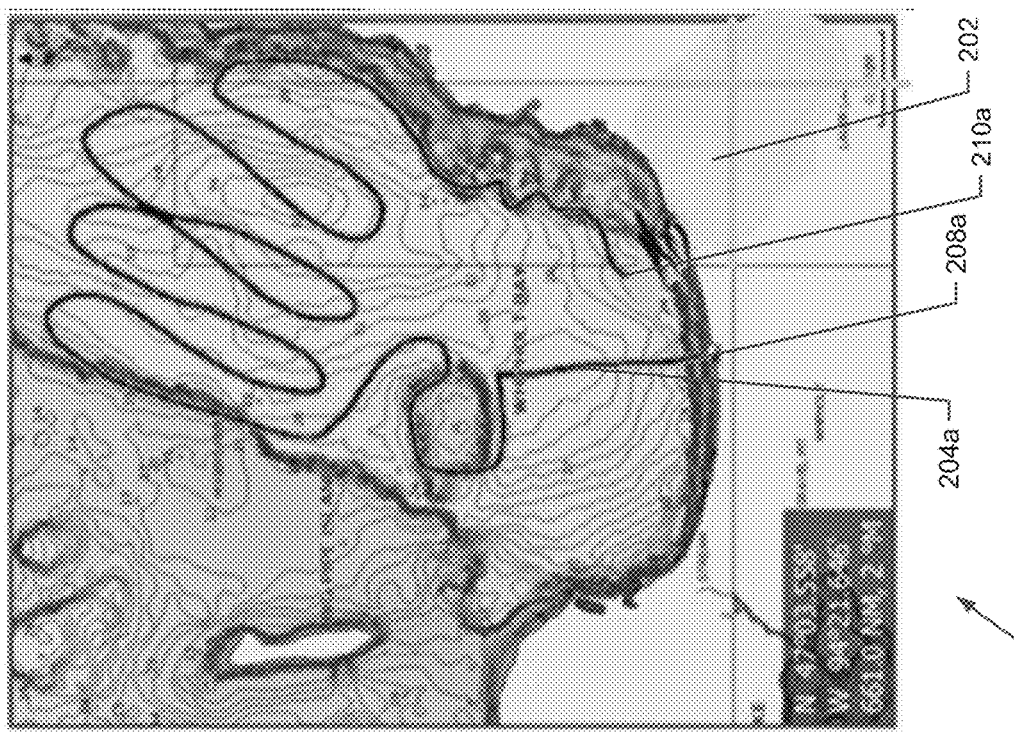
Figure 4:
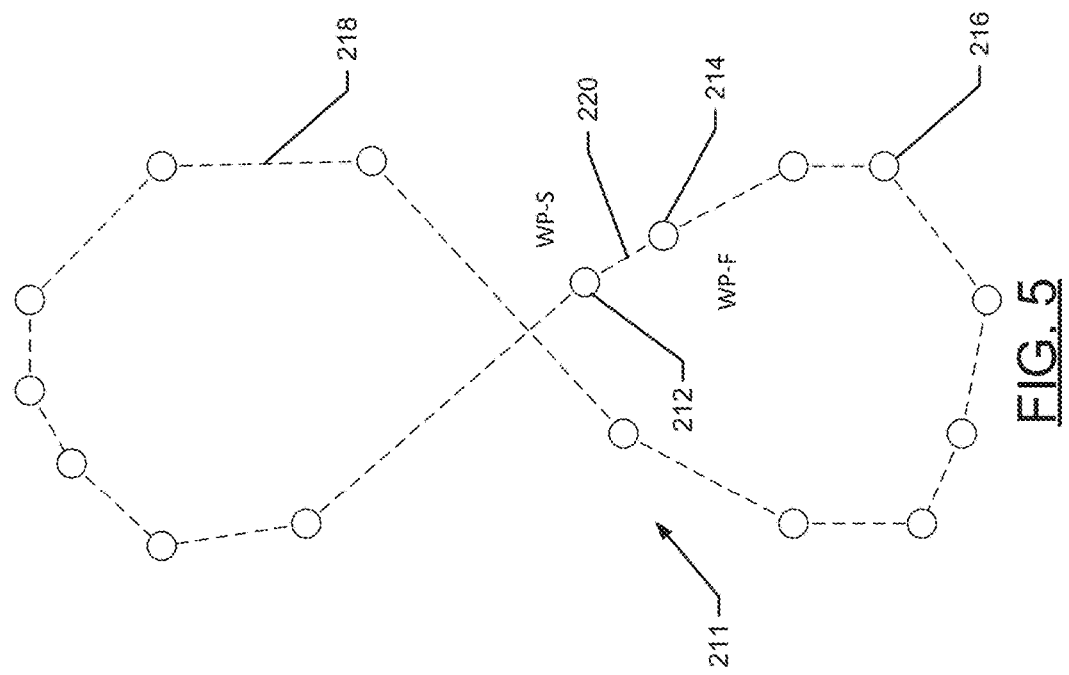
Figure 5:
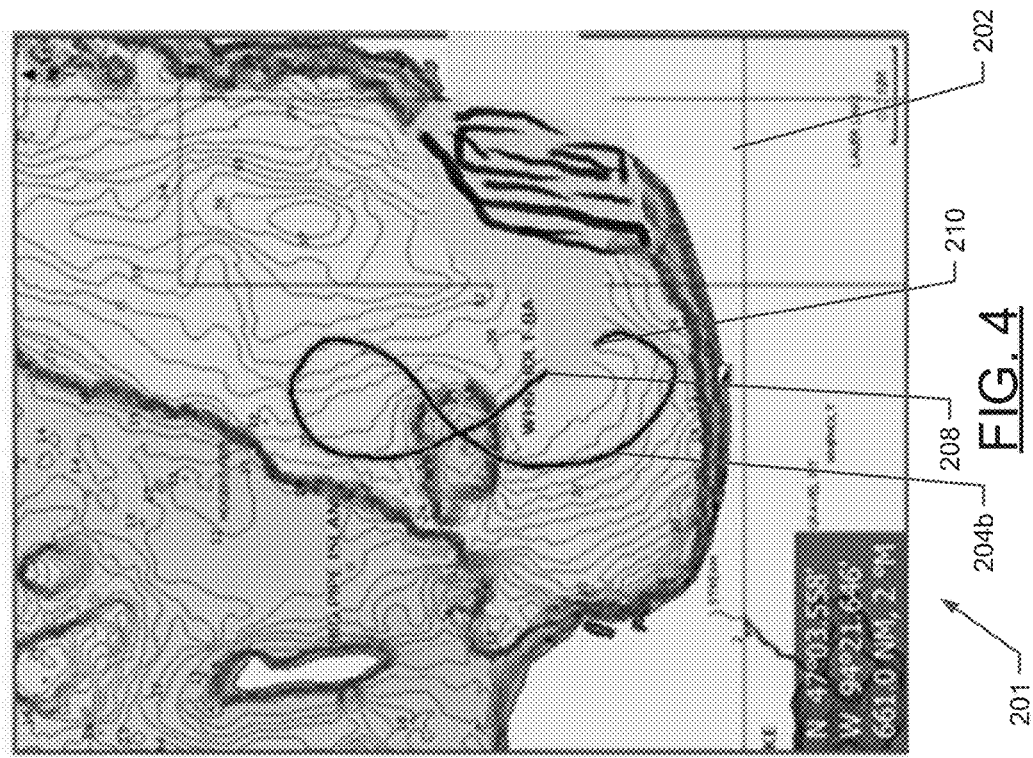
Figure 8:
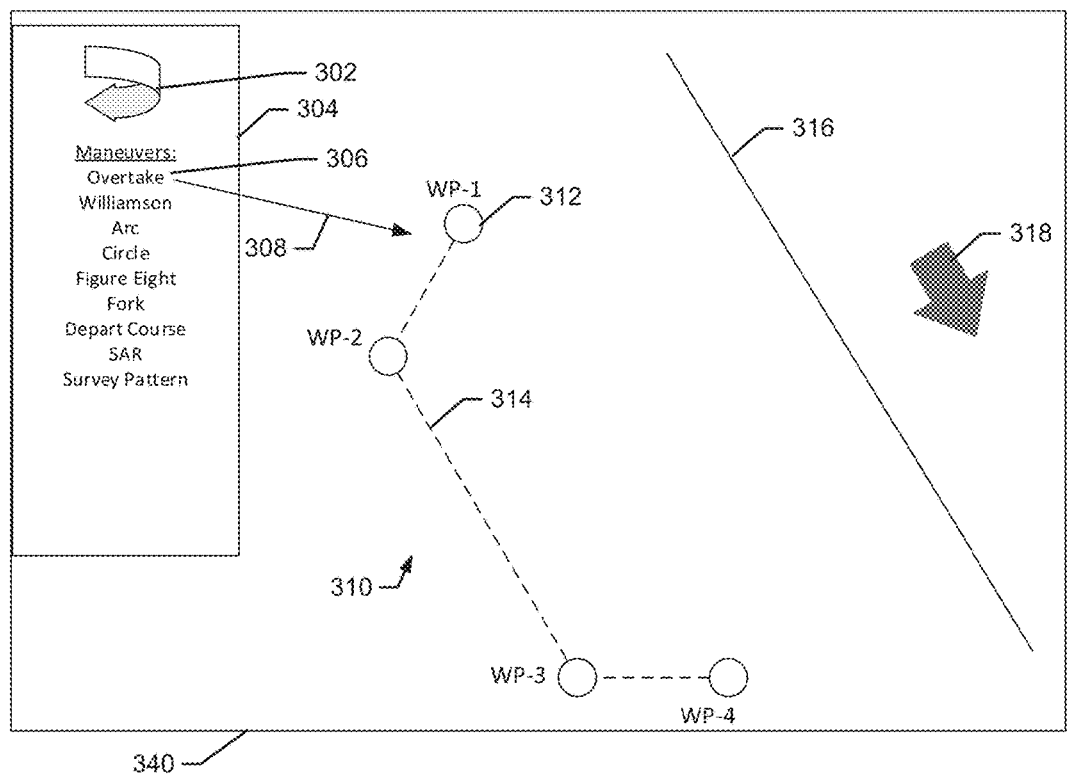
Figures 9A, 9B:
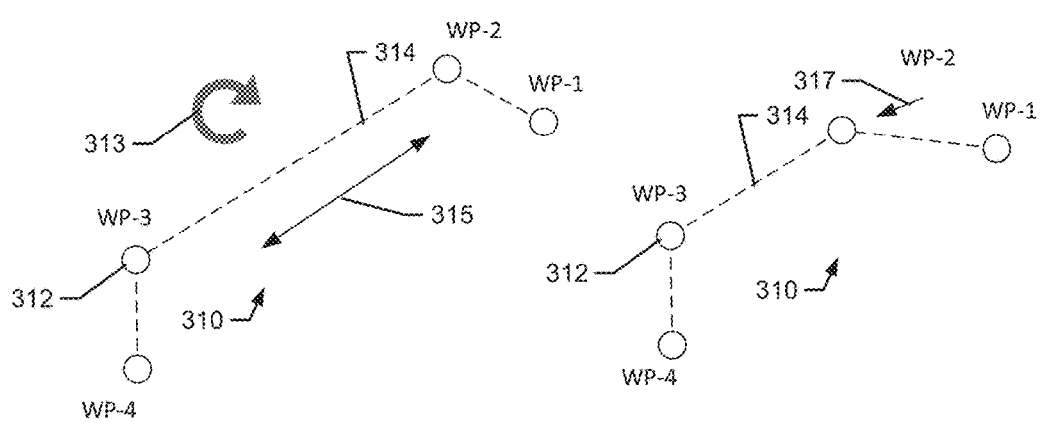
Figure 10:
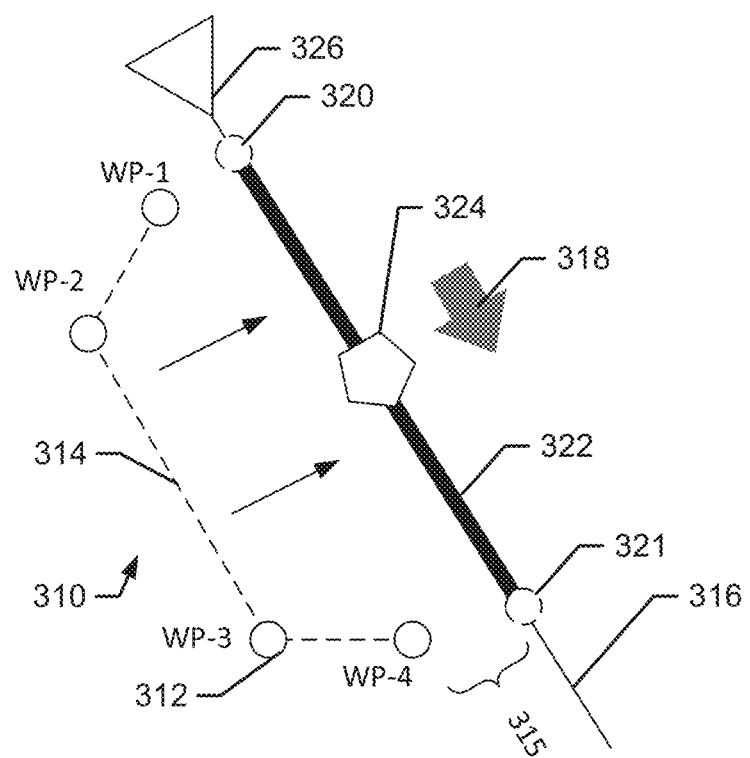
Figure 11:
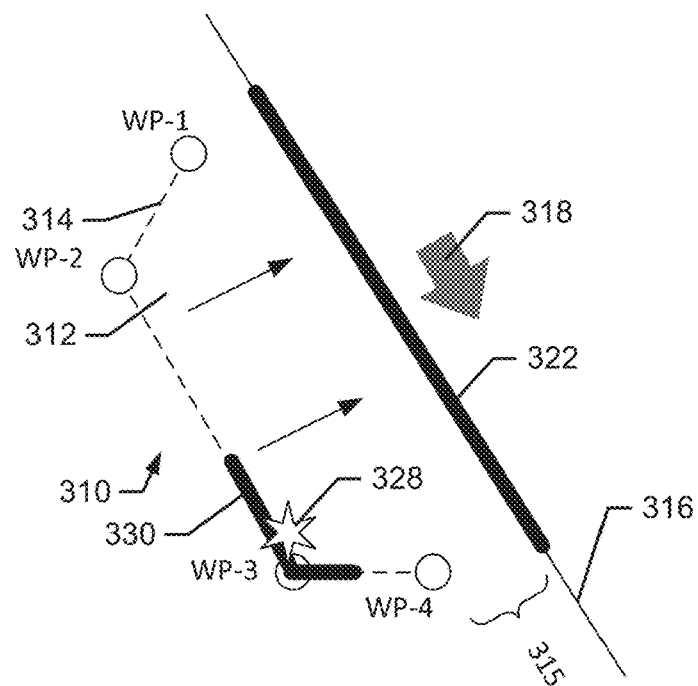
Figure 12:
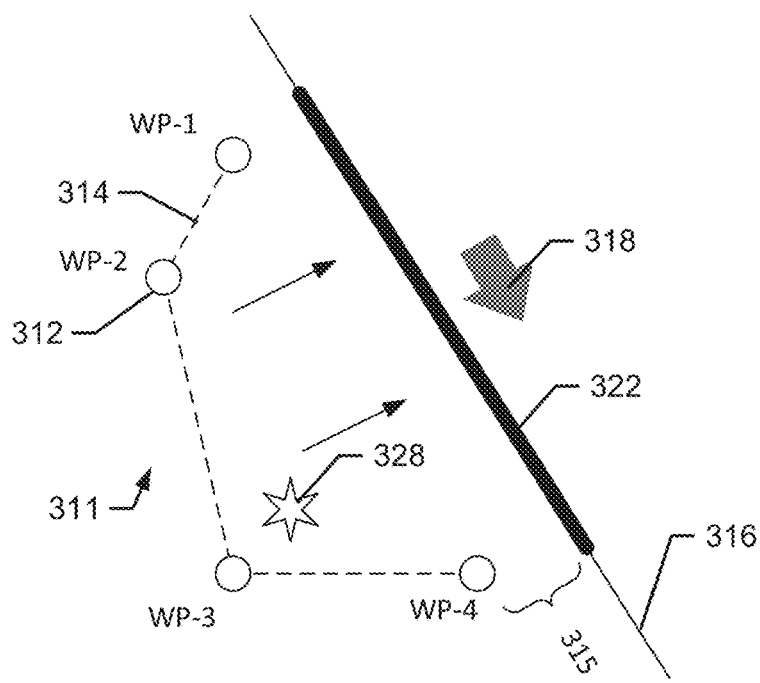
Figure 13:
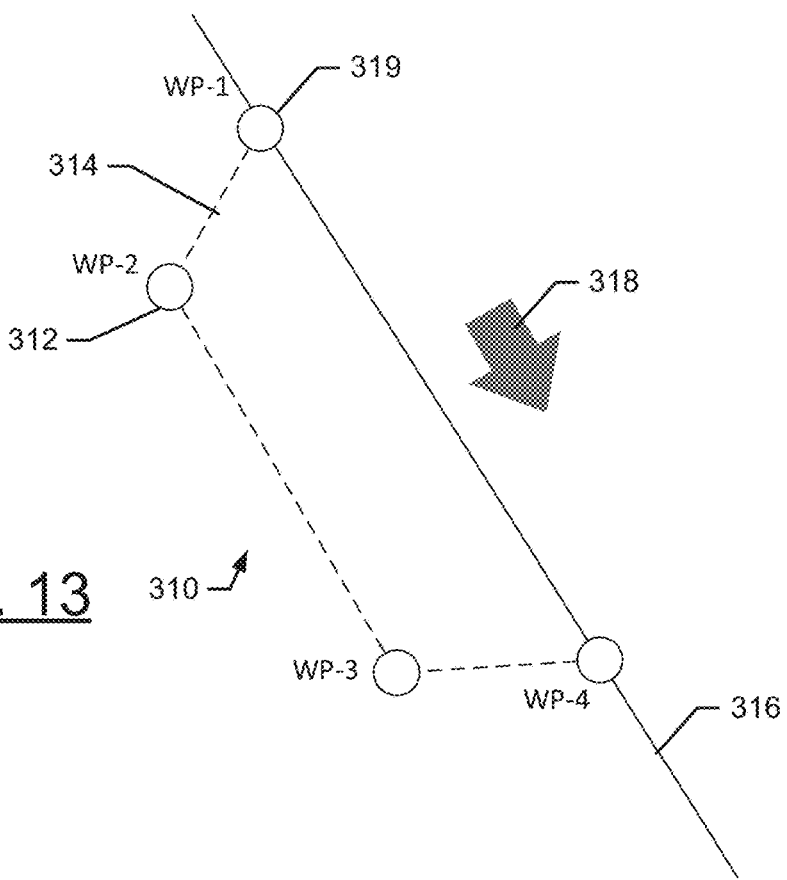
Figure 14:
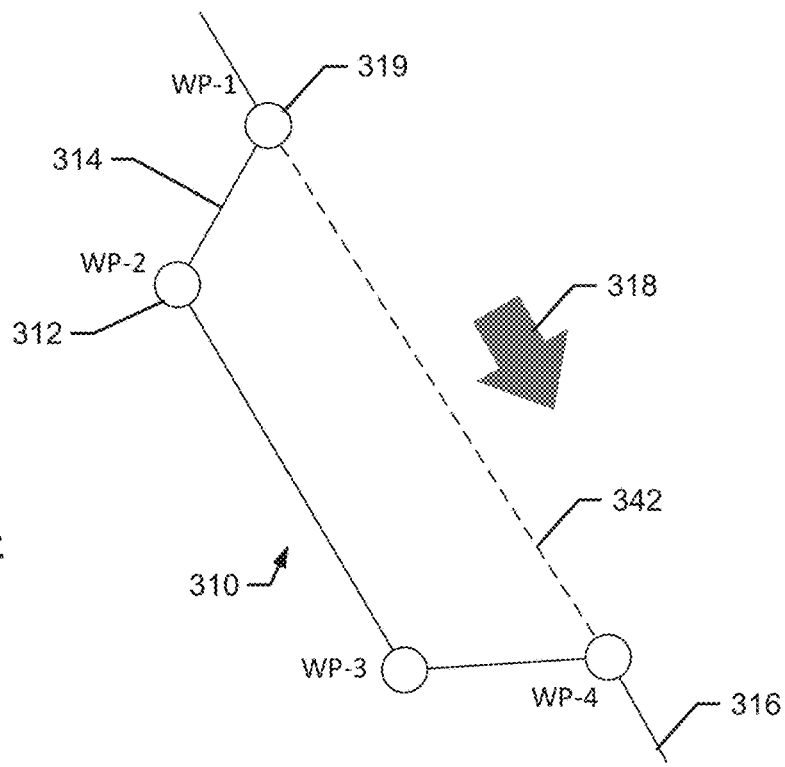
Figure 15A:
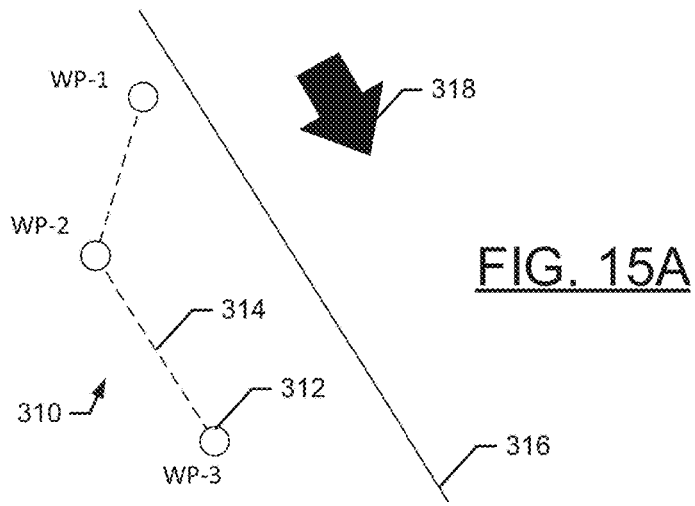
Figure 15B:
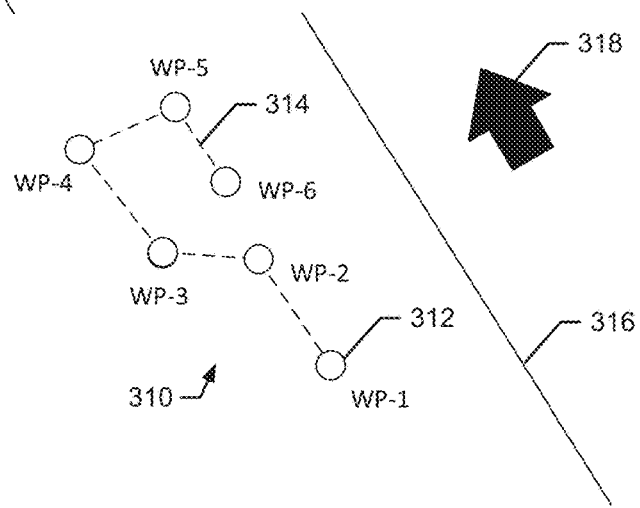
Figure 15C:
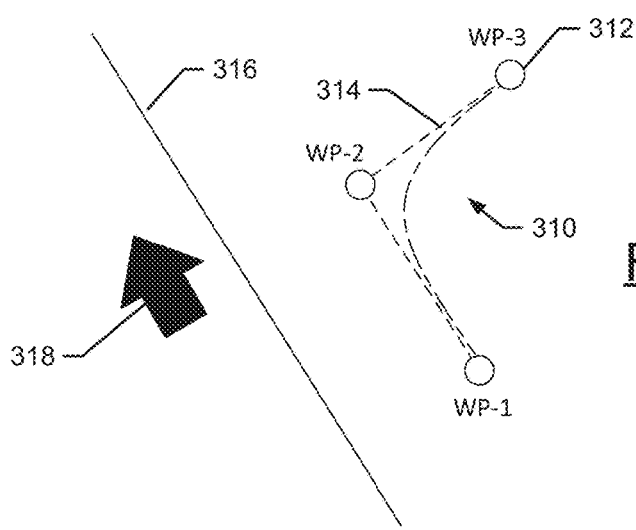
Figure 16:
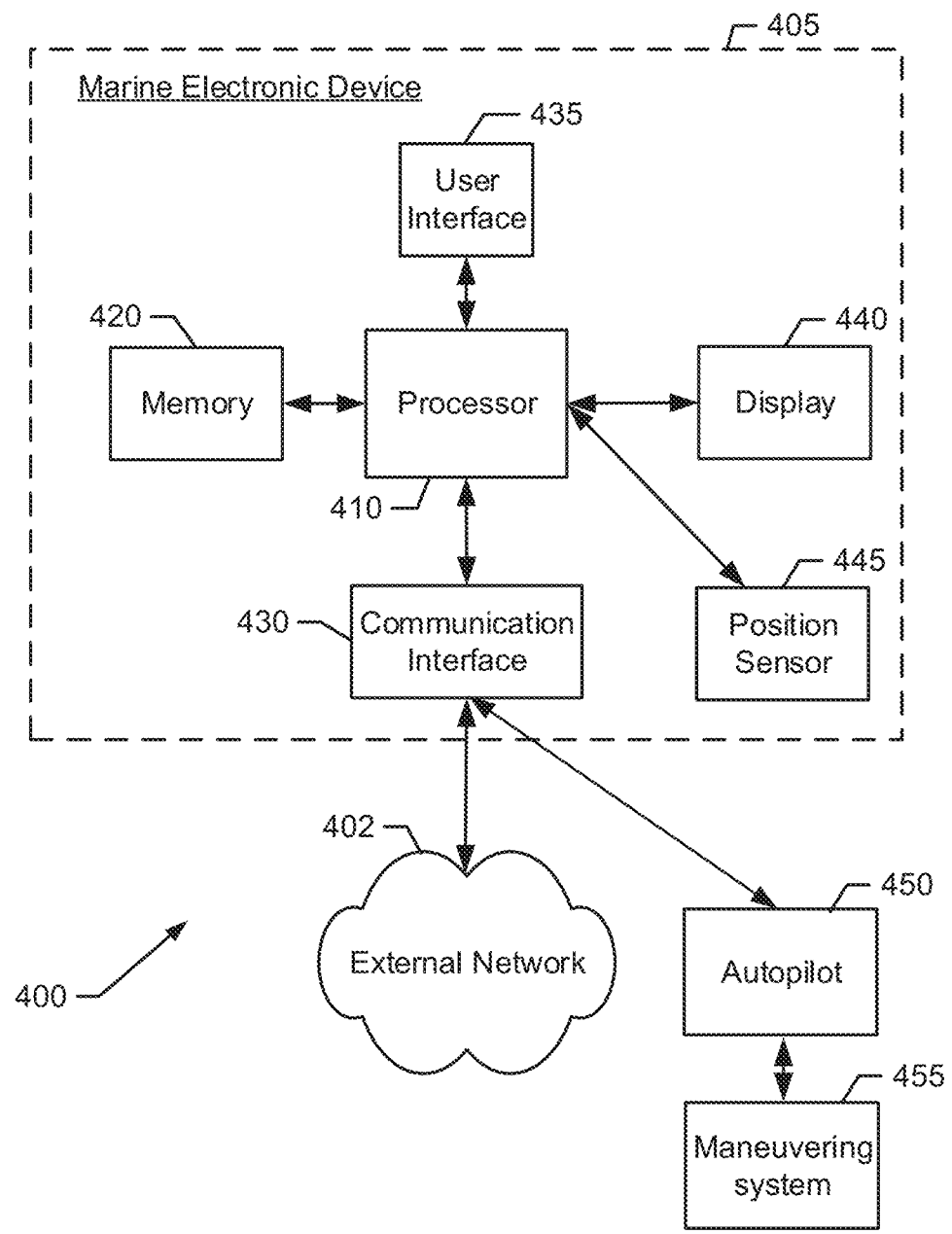
Figure 17:
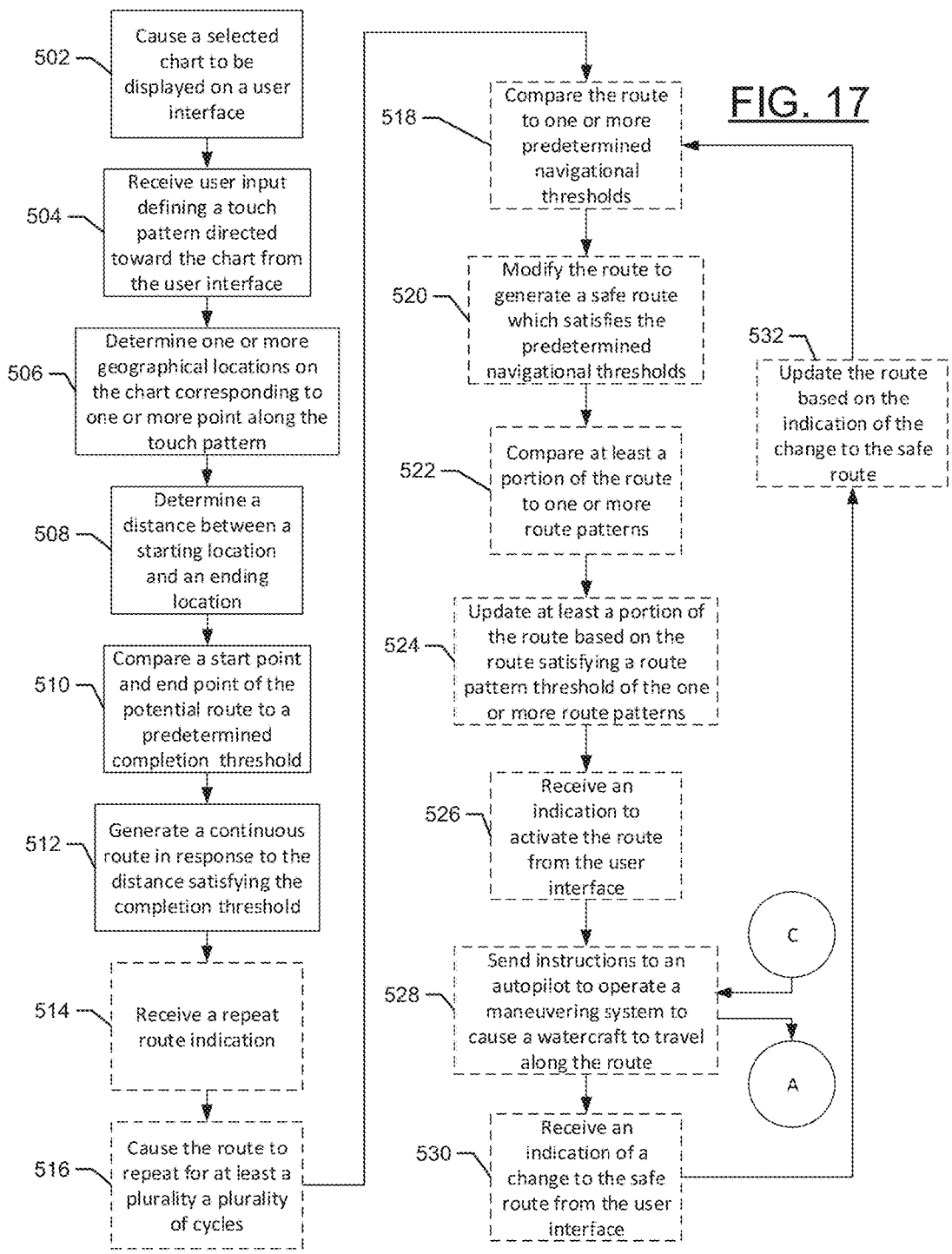
Figure 18:
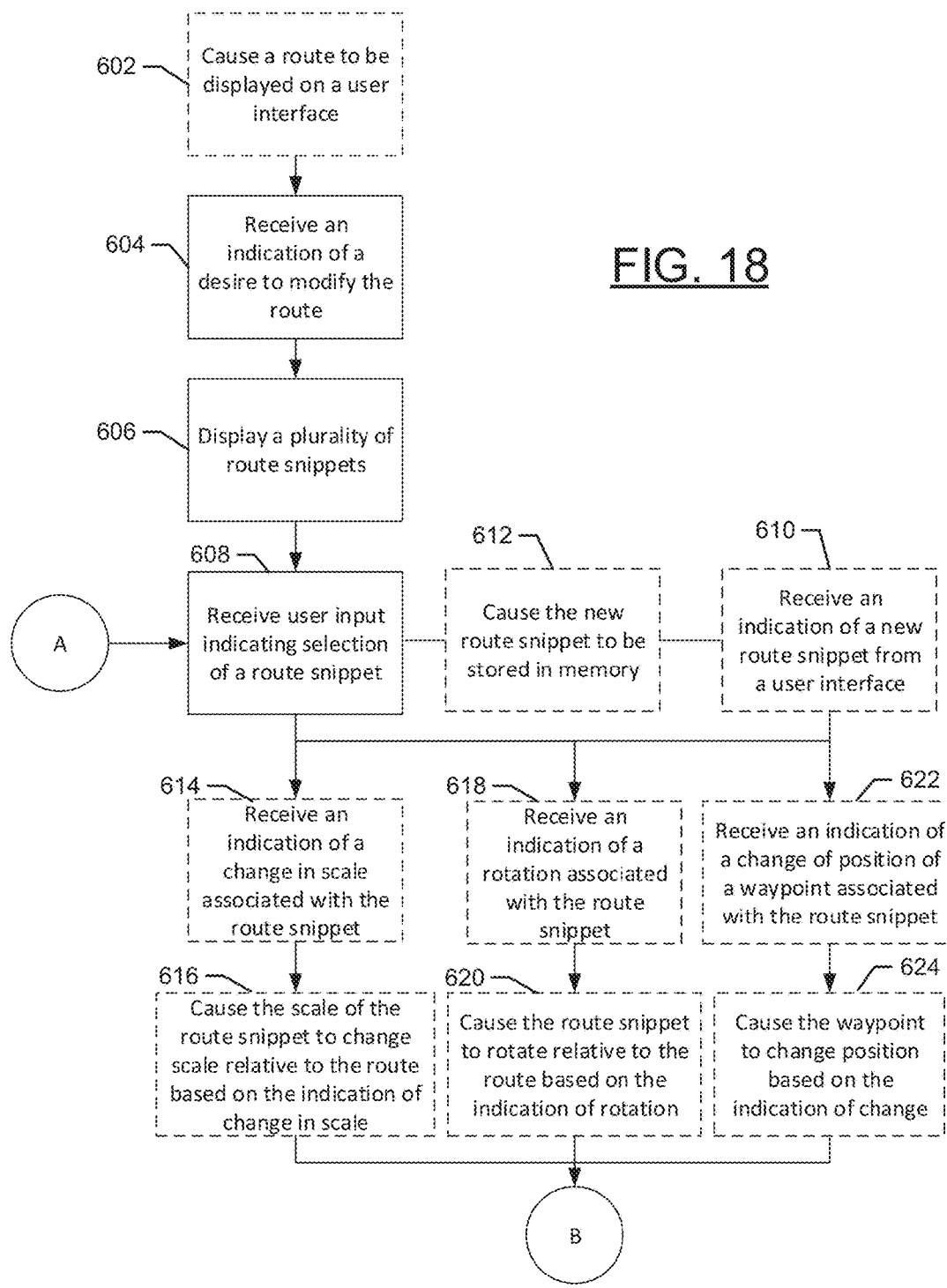
Figure 19:
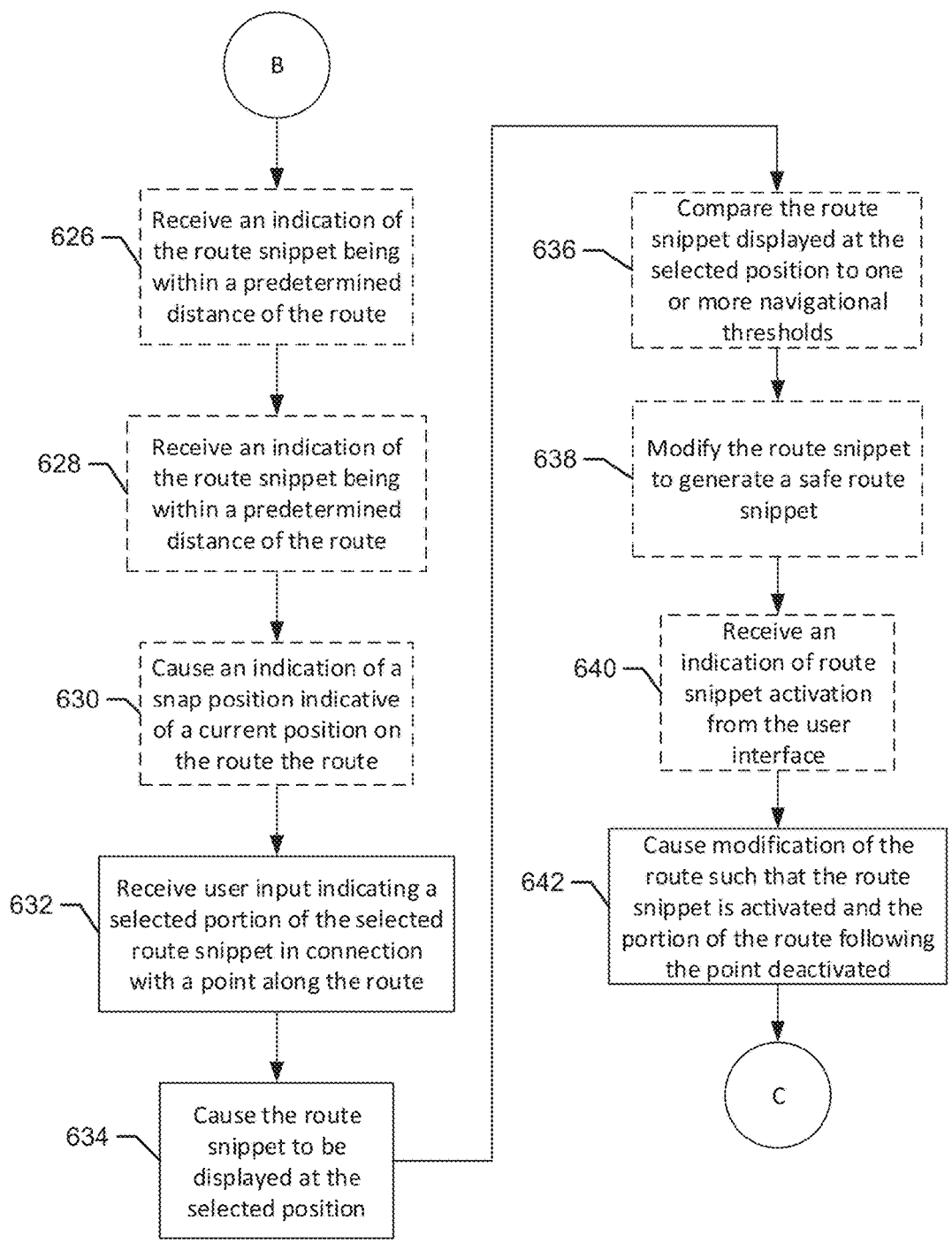

Having thus described the invention in general terms, reference will now be made to the accompanying drawings, which are not necessarily drawn to scale, and wherein:

FIGS. 1A and 1B illustrate example navigational charts including user input, in accordance with some embodiments discussed herein;

FIG. 2 illustrates an example touch pattern generated based on the user input depicted in FIG. 1A in accordance with some embodiments discussed herein;

FIG. 3 illustrates an example route generated based on the touch pattern of FIG. 2 in accordance with some embodiments discussed herein;

FIG. 4 illustrates an example touch pattern generated from the user input depicted in FIG. 1B in accordance with some embodiments discussed herein;

FIG. 5 illustrates an example route generated based on the touch pattern of FIG. 4 in accordance with some embodiments discussed herein;

FIGS. 6 and 7 illustrate an example modification of the route based on navigational thresholds and route patterns according to some embodiments discussed herein;

FIG. 8 illustrates selection of a route snippet according to some embodiments discussed herein;

FIGS. 9A and 9B illustrate modifications of the route snippet according to some embodiments discussed herein;

FIG. 10 illustrates the route snippet in relation to the route including a snap position and vehicles associated with the route according to some embodiments discussed herein;

FIGS. 11 and 12 illustrate modification of a route snippet based on a navigational threshold according to some embodiments discussed herein;

FIG. 13 illustrates the route snippet connected to a point along the route according to some embodiments discussed herein;

FIG. 14 illustrates the route snippet activated and a corresponding portion of the route deactivated according to some embodiments discussed herein;

FIGS. 15A-15C illustrate example route snippets according to some embodiments discussed herein;

FIG. 16 shows a block diagram illustrating an example navigation system in accordance with some embodiments discussed herein; and FIGS. 17-19 illustrate flowcharts of example methods of generating and/or modifying a route according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Electronic navigational charts may be used to indicate topology, depth, boarders, obstacles, or the like for land, air, or marine navigation. FIGS. 1A and 1B illustrate example marine navigation charts 200. In some example embodiments, a marine electronic device, such as described below in reference to FIG. 16, may display the chart 200 for location and/or navigational purposes, for example maneuvering a vehicle or watercraft, such as a boat or ship. In an example embodiment, the marine electronic device may alternatively or additionally, display a chart segment 202. The chart segment 202 may include a portion of the chart 200. The chart segment 202 may be rendered or displayed in a larger scale than the chart 200 and may also include additional details. For example, the chart 200 may have a scale of 1 NM/cm and display a depth line of 25 ft. In contrast, the chart segment 202 may have a scale of 0.3 NM/cm and include depth contour lines with a 1 ft depth change, 5 ft depth change, or the like.

In an example embodiment, the chart 200 and/or chart segment 202 may be displayed on a touch screen 201 of a user interface associated with marine electronic device. The touch screen 201 may sense a user input defining a touch pattern 204 in reference to the chart 200 or chart segment 202. The touch pattern 204 may be generated based on movement of a touch member 206 across the touch screen 201. The touch member 201 may include a user finger, a stylus, or the like.

FIGS. 2 and 4 depict the touch patterns 204 generated by the user input of the touch member 206 depicted in FIGS. 1A and 1B, respectively. The touch pattern 204a depicted in FIG. 2 corresponds to the touch pattern 204 in FIG. 1A, which includes a hand like shape. The touch pattern 204a moves vertically from a starting point 208a and then moves left and clockwise around a shallow point of the chart segment 202. The touch pattern 204a continues by extending upward and right zigzagging in a tear drop like pattern to produce four "fingers." Next, the touch pattern 204a travels downward following a jagged shallow coastal region and terminates at an ending point 210a above and to the right of the starting point 208a. The touch pattern 204 depicted in FIG. 4 corresponds to the touch pattern 204b of FIG. 1B, which includes a figure eight shape moving downward from a starting point 208b turning left and upward and then right and upward. The touch pattern 204b then moves left and downward crossing itself at the shallow point of the chart segment 202. The touch pattern 204b terminates at an ending point 210b above and to the left of the starting point 208b.

FIG. 3 depicts an example route 211 based on the touch pattern 204a depicted in FIG. 2. The marine electronic device may determine one or more geographic locations, such as global coordinates or relative coordinates, on the chart 200 corresponding to one or more points along the touch pattern 204a. The geographical locations may be determined based on a correlation between pixels of the touch screen associated with the touch pattern 204a and chart locations. For example, the marine electronic device may correlate pixels, or pixel groups, such as 4 pixels, 8 pixels, 16 pixels, or the like, with chart locations on the displayed chart 200 or chart segment 202. The marine electronic device may then correlate the touch pattern 204 to the chart locations by selection of the pixels associated with the touch pattern 204. In a similar example, the marine electronic device may determine the position of a pixel on the touch pattern with respect to the chart, and then determine the geographical location on the chart associated with that position.

In some instances, the touch pattern 204a may be associated with a plurality of pixels at each point along the touch pattern 204a, the marine electronic device may select a center pixel or pixel group to represent each of the points along the touch pattern 204a. Each of the chart locations may be associated with a geographic location including a global coordinate position and/or a relative coordinate position.

The geographic locations may include a starting location 212 corresponding to the starting point 208a and an ending location 214 corresponding to the ending point 214. The route 211 may also include additional geographic locations, e.g. waypoints 216, between the starting location 212 and the ending location 214. For example, the waypoints 216 may be associated with turns or changes of a course heading along the route 211. The route may include route segments 218 between each waypoint 216, the starting location 212, and/or the ending location 214. Each route segment may be associated with a course heading for navigation between each waypoint 216, the starting location 212, and/or the ending location 214. The route 211 depicted in FIG. 5 may be generated in substantially the same manner as described above in reference to FIG. 7, based on the touch pattern 204b depicted in FIG. 4.

In an example embodiment, the marine electronic device may determine distance between the starting location 212 and the ending location 214. The distance may be the actual distance between the starting location 212 and the ending location 214, such as nautical miles, feet, meters, or the like. Additionally or alternatively, the distance may be a relative distance, such as the distance between the starting point 208 and ending point 210 associated with the starting location 212 and ending location 214, respectively, such as centimeters, inches, or the like. As used herein, in some embodiments, the distance may be a direct distance between the starting location 212 and the ending location 214, as opposed to an indirect distance (e.g., the distance of the route if there are turns, etc.).

The marine electronic device may compare the distance to a predetermined completion threshold. The predetermined completion threshold may be 0.3 NM, 1 NM, 100 m, 1500 ft, or the like, in an instance in which the distance is an actual distance; or 0.5 cm, 1 cm, 1 in, or the like in an instance in which the distance is a relative distance.

In an example embodiment, the marine electronic device may complete the route, generating a continuous route in an instance in which the distance satisfies, e.g. is less than or within, the completion threshold. As shown in the example embodiment depicted in FIG. 3, the route 211 may completed by shifting or "snapping" the ending point 210a and corresponding ending location 214 to match the starting point 208a and corresponding starting location 214. A route segment 215 may be generated connecting the waypoint 216 before the ending location 214 to the starting location 212. In such an embodiment, the ending location 214 is not a part of the route. As shown in the example embodiment depicted in FIG. 5, the route 211 may be completed by adding a route segment 220 connecting the ending location 214 to the starting location 212.

The marine electronic device may receive an indication to activate the route 211 from the user interface. The indication to activate the route 211 may include selection of an activate icon, selection of the route 211, actuating a button, such as a start or engage autopilot button, or the like. The vehicle, such as a watercraft, may be piloted manually along the route 211 by a user. For example, the user may use the route information such as course heading relative to waypoint 216 to steer the vehicle along the route 211.

Additionally or alternatively, the vehicle may automatically travel along the route 211, such as navigation by an autopilot. In response to the indication to activate the route 211, the marine electronic device may send instructions to the autopilot. The instructions to the autopilot may be configured to cause the autopilot to operate a maneuvering system to cause the vehicle to travel along the route 211. The maneuvering system may include one or more motors or engines, one or more rudders, or the like. The instructions may include an operating speed the one or more motors or engines and/or rudder or engine angles for steering the watercraft.

In an example embodiment the marine electronic device may receive a repeat route indication. The repeat route indication may include selection of an icon or button, or completion of the route 211 based on satisfying the predetermined completion threshold, as discussed above. In response to the repeat route indication, the marine electronic device may cause the route 211 to be repeated two or more times, or cycles. In an instance in which an autopilot is utilized the marine electronic device may send instructions to the autopilot to cause the autopilot to operate the maneuvering system to travel along the route 211 a plurality of times or cycles.

In an example embodiment, the marine electronic device may receive an indication of a change to the route 211. For example, the indication of change may include selecting and moving a route segment 218 or waypoint 216, such as by drag and drop, or by selecting and activating a route snippet, as discussed below in FIGS. 8-14. In response to the indication of change, the marine electronic device may update route 211 based on the indication of the change to the route 211, such as moving one or more waypoints 216 or adding additional waypoints 216 and/or route segments to correspond with the indication of change.

FIGS. 6 and 7 illustrate example modification to a route 211 based on navigational thresholds and route patterns. The route 211 may be proximate to one or more navigational features 220, such as depth, land, obstacles, or the like. For example, the navigational features may include a shallow depth which the vehicle may have an increased likelihood of striking ground, such as the shallow areas discussed above in reference to FIGS. 2 and 4. Example obstacles may include buoys, sand bars, fish farms, or the like, which may or may not be visible above the surface of the water. The marine electronic device may compare the route 211 or portions of the route 211 to a navigational threshold, such as a minimum safe distance 222 from the navigational feature 220. The minimum safe distance 222 may be 1 m, 3 m, 10 m, or the like for smaller vehicles or 30 m, 50 m, or 500 m, for larger vehicles.

The marine electronic device may modify the route 211 or portions of the route 211 to generate a safe route 213 which satisfies minimum distance 222. As depicted in FIG. 7, the way points 216 and associated route segments 218 of the safe route 213 have been modified to locations farther away from the navigational features 220 to satisfy the minimum distance 222.

In some example embodiments, the marine electronic device may compare the route 211 or a portion 221 of the route 211 to one or more route patterns. The route patterns may include search and rescue patterns, such as a creeping line ahead pattern or a Williamson maneuver, fishing patterns, survey patterns, military maneuvers, standardized navigation maneuvers, or the like. Each of the route patterns may include two or more non-geographically referenced points, including relative distances between the points. The marine electronic device may determine a probability score for the route 211 or portion 221 of the route 211 based on the route patterns. The probability score may be indicative of a percent match between the route 221 or portion 221 of the route 211 and the route pattern and may be determined based on machine learning and/or pattern recognition. The marine electronic device may compare the probability score to a match threshold, such as 75 percent, 80 percent, or the like. In an instance in which the probability score satisfies, e.g. is greater than, the match threshold, the marine electronic device may update the route 211 or portion 221 of the route 211 based on the route pattern. For example, the marine electronic device may shift waypoints 216 and route segments 218 in the portion 221 of the route to match the relative shape of the route pattern, such as depicted in portion 223. In the example depicted in FIG. 6 the marine electronic device may compare the portion 221 of the route 211 to one or more route patterns. The portion 221 includes the "finger" portions of the route 211. The marine electronic device may determine a probability score for the portion 221 of the route 211 in reference to a creeping line ahead pattern, such as 83 percent. The marine electronic device may update one or more of the waypoints 216 and route segments 218 to match the relative shape of the creeping line ahead route pattern. For example, the marine electronic device may cause the waypoint of the portion 223 of the safe route 213 to align, forming an equidistance set of back and forth route segments 218. In some embodiments, curved route segments could be utilized between waypoints to create a smooth route.

Additionally or alternatively, the navigational threshold discussed above may be based on a speed of the vehicle and/or a turn radius associated with the speed of the vehicle.

The navigational threshold may include a maximum change in a course heading for a waypoint based on the speed of the vehicle, for example, due to the length and/or displacement of larger vessels, such as cargo ships, as the speed of the vehicle increases a larger change in course heading may be achievable by the vehicle. Similarly, the navigational threshold may include a comparison of a plurality of waypoints 216 to a minimum radius 224 based on the speed of the vehicle, for example, the minimum radius 224 may decrease in size as the vehicle increases in speed and is capable of tighter maneuvers. Conversely, smaller vessels, such as small fishing boats, speed boats, or the like, may have decreased maneuverability as the speed of the vehicle increases. As such, the minimum radius 224 may increase in size as the speed of the vehicle increases. The marine electronic device may modify the route 221 or portion 225 of the route 221 to generate a safe route 213 which satisfies the navigational thresholds. As shown in the example depicted in FIGS. 6 and 7, the waypoints 216 and route segments 218 may be shifted to satisfy the navigational minimum radius 224.

The route 211 and/or safe route 213 may be a best fit of the touch pattern 204 and/or satisfaction of the navigational thresholds. A best fit may include the closest the waypoints 216 and route segments 218 may be generated to the touch pattern 204 based on a maneuvering threshold. Maneuvering thresholds may include minimum course change per unit distance, maximum number of waypoints per course change per unit distance, or the like. For example, the touch pattern 204 may not be perfectly straight such that the marine electronic device may smooth the course based on the minimum course change per unit distance. For example, several minor course changes such as 1 degree, 5 degrees, or the like, which shift back and forth in direction of divergence from a course, may be smoothed between larger course change waypoints. In some instances, the touch pattern 204 may include curves, turns, or similar maneuvers. In such a circumstance, the marine electronic device may generate waypoints 216 along the maneuver based on the maximum number or way points per course change per unit distance. For example, a curve could be defined by a nearly continuous number of waypoints along the curve. However, the marine electronic device may determine a number of waypoints 216 to accomplish the general shape of the route and minimize changes to the course. In an illustrative example, the maximum number of waypoints per course change per unit distance may be 5 waypoints per 90 degree course change per 0.3 NM. The maneuvering thresholds may cause the marine electronic device to generate a route 211 that is smoother than the touch pattern 204 and includes fewer changes in course, which may reduce wear and tear on the maneuvering system and/or reduce processing for generating the route 211.

In some instances, a user may desire a change to the route, such as a predetermined maneuver, for example overtaking another vehicle along the route, a man overboard or Williamson maneuver, or the like. FIGS. 8-15 illustrate modification of a route 316 by insertion of a route snippet 310. A route snippet 310 may be a non-geographically referenced navigational maneuver. The route snippet 310 may be defined by two or more waypoints 312 and route segments 314 further defining relative distance and/or course heading between the waypoints 312.

The route 316 may be displayed on a screen 340 of the user interface. A direction of travel 318 is provided for illustrative purposes, but may be displayed in at least some example embodiments. The marine electronic device may receive an indication of a desire to modify the route, such as selection of a route snippet icon 302, a modify route button, or the like. A plurality of route snippets indicators 306 associated with a plurality of route snippets, e.g. at least a portion of a route snippet library, may be displayed in response to the indication of a desire to modify the route. The route snippet indicators 306 may include a route snippet name, a route snippet shape, and/or the route snippet 310 itself. The marine electronic device may receive an indication of selection of a route snippet 310. The indication of selection of the route snippet 316 may be a touch or click of the selected one of the route snippet indicators 306. In some instances the route snippet indicator 306 may be dragged onto a chart area near the route 316, as depicted by arrow 308.

In an example embodiment in which the screen 340 includes a touch screen, the marine electronic device may receive a user input from the touch screen defining a new route snippet 310. The route snippet 310 may be generated in a manner substantially similar to a route 211 based on a touch pattern 204, as discussed above in reference to FIGS. 2-5. The marine electronic device may cause new route snippet 310 to be stored in memory, such as with the plurality of route snippets, e.g. the route snippet library. In some example embodiments, selection of a route snippet 310 may include the user input defining the new route snippet 310.

In some instances, the route snippet 310 may be modified as depicted in FIGS. 9A and 9B. The marine electronic device may receive an indication of rotation 313. The indication of rotation 313 may be a gesture, in an instance in which the screen 340 is a touch screen, such as a two fingers twist in a desired direction. Alternatively, the indication of rotation 313 may include a selection of a portion of the route snippet 310 by a pointing device, such as a mouse, a finger, a stylus, or the like and moving the selected portion to rotate the route snippet 310. The marine electronic device may cause the route snippet 310 to rotate relative to the route 316 based on the indication of rotation 313.

In some instances, the marine electronic device may receive an indication of change of scale 315. The indication of change of scale 315 may be a gesture on the touch screen, such as two fingers expanding or contracting. Alternatively, the indication of change of scale may include a selection of a portion of the route snippet 310 by the pointing device, such as mouse, finger, stylus, or the like and moving the selected portion to stretch the route snippet 310. The change of scale may include a change in length and/or width of the route snippet 310, while maintaining the relative shape of the route snippet 310. The marine electronic device may cause the route snippet to change scale relative to the route 316 based on the indication of change of scale 315.

In an example embodiment, the marine electronic device may receive an indication of a change in position 317 of one or more waypoints. The indication of the change in position 317 may be a gesture on the touch screen, such as a drag and drop. Additionally or alternatively, the indication of change 317 of the position may include selection of a waypoint 312, by the pointing device, to a desired position. The marine electronic device may update the route snippet 310 based on the indication of change 317

As depicted in FIG. 10, a vehicle location 326 associated with the marine electronic device may be displayed along the route 316. The vehicle location may be based on a positioning system, e.g. global positioning system (GPS), inertial based location, such as ring laser gyroscopes, bottom contour, or the like. Additionally or alternatively, the marine electronic device may display other vehicles 324 or navigational features 328 (as depicted in FIGS. 10-12) within a current display area associated with the route 316. The locations associated with vehicles 324 may be based on radar, sonar, manual input, an automatic identification system (AIS), or the like. Locations associated with navigational features, such as shallow depth, land, reefs, constructions, rocks, or the like may be based on charted features, radar, manual input, or the like. Display of the vehicle location 326, vehicles 324 and navigational features 328 may assist the user in a selection of a position of the route snippet 310 along the route 316.

In an example embodiment, the route snippet 316 may be moved or dragged proximate to the route 316. In an instance in which the marine electronic device receive an indication of the route snippet 310 within a predetermined distance 315 of the route 316, an indication of a snap position 322 may be displayed on the route 316 (e.g., the increased line weight shown in FIG. 10). The predetermined distance may be 1 cm, 2 cm, 3 cm, or the like. The snap position 322 may include the currently selected portion or position along the route 316. The snap position may be displayed in visual contrast to the route 316, such as in a different color, different line weight, highlighting, or the like. In some example embodiments, the snap position 322 may, additionally or alternatively, include a snippet start position 320 and a snippet end position 321 indicating positions along the route at which the route snippet is currently selected to be connected to.

As depicted in FIG. 11, the marine electronic device may compare the route snippet 310 at a current position, such as the snap position 322, or selected position along the route 316 to one or more predetermined navigational thresholds, such as navigational features, e.g. depth, land, obstacles, or the like. The comparison of the route snippet 310 to navigational thresholds may be substantially similar to the comparison of the route 211 to the navigational thresholds discussed above in reference to FIGS. 6 and 7. In an instance in which the route snippet 310 fails to satisfy a navigational threshold, such as a navigational feature 328 within a minimum distance, e.g. minimum distance 222, the marine electronic device may cause a notification of an unsafe route 330 to be displayed. The notification 330 may indicate that at least a portion of the route snippet 310 fails to satisfy the predetermined navigational threshold. The notification may be a dialog box rendered on the display of the user interface. In some example embodiments, the notification 330 may include displaying the portion of the route snippet 310 which fails to satisfy the predetermined navigational threshold in visual contrast. The visual contrast may include displaying the notification 330 in a different color, line weight, highlighting, an "X", or the like from the remainder of the route snippet 310.

In an example embodiment, the marine electronic device may modify the route snippet 310, as depicted in FIG. 12 to generate a safe route snippet 311. The safe route snippet 311 may be based on the route snippet 310 and satisfying the predetermined navigational thresholds.

The marine electronic device may receive an indication of a selected position of the selected route snippet 310 in connection with a point along the route 316. The selected position may be selected as a portion of a multi point selection process, such as selection of a waypoint 312 of the route snippet and selection of a point on the route 316. As depicted in FIG. 13, the route snippet 310 may be displayed at the selected position of the route, such that a beginning of the route snippet 310 is connected to the point along the route 316. Alternatively, the route snippet 310 may be displayed at the selected position of the route automatically at the snap position 322 in response to receiving a user input indicating a release of the route snippet 310 from the touch screen, such as the release portion of a drag and drop gesture.

The route snippet 310 may be displayed in contrast, e.g. a different color such as green or black, different line weight, highlighting, or the like, than the active route 316, which may be displayed in red. The route snippet 310 may be activated by a user input, such as selection of an activate button, execute route snippet icon, double clicking the route snippet 310, right clicking the route snippet and selecting activate from a menu, or the like.

As shown in FIG. 14, the marine electronic device may cause a modification to the route 316 such that the route snippet 316 when activated becomes a portion of the route and a portion 342 of the route 316 following the point 319 is deactivated. The deactivated portion 342 may be displayed in contrast to the active route in a manner substantially similar to the non-activated route snippet discussed above.

A user may manually navigate the vehicle to travel along the modified route, e.g. the route 316 including the activated route snippet 310. In an instance in which, an autopilot is being utilized; the marine electronic device may send instructions to the autopilot to control the maneuvering system to travel along the modified route.

In some example embodiments, the route 316 may be stored to a memory for future use or review. In some example embodiments, the route 316 may be stored separately, e.g. without, the route snippet 310.

The route snippets 310 may include any number of predetermined navigational maneuvers. For example, FIGS. 8-14 depict an overtake maneuver route snippet 310. The overtake route snippet 310 may include a first route segment including a divergence from the route at approximately 45 degrees, a route segment running approximately parallel to the route, and a route segment converging on the route 316 at approximately 45 degrees. The route snippet 310 of FIG. 15A depicts an example fork maneuver, in which a first route segment departs from the route 316 and a second route segment terminates at a point not along the route 316. In such a case, the remaining route may be recalculated accordingly. The route snippet 310 of FIG. 15B depicts a Williamson maneuver, e.g. a man overboard maneuver, in which the route snippet diverges from the route 316 and turns back the opposite direction along the route 316. The route snippet 310 of FIG. 15C depicts an arc or circle portion, in which the route snippet include an arc between three waypoints 312. The route snippets depicting navigational maneuvers as discussed and depicted herein are merely for illustrative purposes, other nautical maneuvers may include, without limitation, search and rescue patterns, survey patterns, military maneuvers, fishing or industrial maneuvers, or the like.

Example System Architecture

FIG. 16 shows a block diagram of an example navigation system 400 capable for use with several embodiments of the present invention. As shown, the navigation system 400 may include a number of different modules or components, each of which may comprise any device or means embodied in either hardware, software, or a combination of hardware and software configured to perform one or more corresponding functions. For example, the navigation system 400 may include an autopilot 450, a maneuvering system 455, and a marine electronic device 405.

The navigation system 400 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g. a marine electronic device 405) may be included in the navigation system 400.

The marine electronic device 405 may include a processor 410, a memory 420, a user interface 435, a display 440, one or more sensors (e.g. position sensor 445, orientation sensor (not shown), etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide route data for navigation of a vehicle, such as a watercraft. For example, the processor 410 may be configured to receive route data and user input associated with the route data to generate or modify a route for display to a user (e.g. on display 440/user interface 435). Additionally or alternatively, the processor 410 may be configured to generate and send route data including instructions to the autopilot 450 to operate the maneuvering system 455 to cause the vehicle to travel along the route.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

The memory 420 may be configured to store instructions, computer program code, marine data, such as sonar data, chart data, location/position data, and other data associated with the navigation system in a non-transitory computer readable medium for use, such as by the processor.

The communication interface 430 may be configured to enable connection to external systems (e.g. an external network 402). In this manner, the marine electronic device 405 may retrieve stored data from a remote, external server via the external network 402 in addition to or as an alternative to the onboard memory 420.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or the like, or other location detection system.

The display 440 may be configured to display images and may include or otherwise be in communication with a user interface 435 configured to receive an input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 16 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405. Similarly, the autopilot 450 is depicted remote from the marine electronic device 405, but may be directly connected to the processor 410 within the marine electronic device.

The autopilot 450 may include processing circuitry, such as a processor and a memory, configured to operate the maneuvering system 455. The autopilot 450 may be configured to operate the maneuvering system automatically, e.g. without user interaction, causing a vehicle, such as a watercraft to travel along the route 211. The autopilot 450 may generate instructions based on a vehicle position, the route or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vehicle.

Example Flowchart(s) and Operations

Embodiments of the present invention provide methods, apparatus and computer program products for generating or modifying routes for navigation of a vehicle. Various examples of the operations performed in accordance with embodiments of the present invention will now be provided with reference to FIGS. 17-19.

FIGS. 17-19 illustrate flowcharts according to an example method for generating and/or modifying a route for navigation of a vehicle according to an example embodiment. The operations illustrated in and described with respect to FIGS. 17-19 may, for example, be performed by, with the assistance of, and/or under the control of one or more of the processor 410, memory 420, communication interface 430, user interface 435, position sensor 445, display 440, autopilot 450 and/or maneuvering system 455. The method may include causing a selected chart to be displayed on a user interface at operation 502, receiving user input defining a touch pattern directed toward the chart from the user interface at operation 504, and determining one or more geographical locations on the chart corresponding to one or more points along the touch pattern at operation 506. The method may also include determining a distance between a starting location and an ending location at operation 508, comparing a start point and end point of the potential route to a predetermined completion threshold at operation 510, and generating a continuous route in response to the distance satisfying the completion threshold at operation 512.

In some embodiments, the method may include additional, optional operations, and/or the operations described above may be modified or augmented. Some examples of modifications, optional operations, and augmentations are described below, as indicated by dashed lines, such as, receiving a repeat route indication at operation 514, causing the route to repeat for at least a plurality of cycles at operation 516, comparing the route to one or more predetermined navigational thresholds at operation 518, and modifying the route to generate a safe route which satisfies the predetermined navigational thresholds at operation 520. In some example embodiments, the method may also include comparing at least a portion of the route to one or more route patterns at operation 522, updating at least a portion of the route based on the route satisfying a route pattern threshold of the one or more route patterns at operation 524, and receiving an indication to activate the route from the user interface at operation 526. At operation 528, the method may include sending instructions to an autopilot to operate a maneuvering system to cause a vehicle to travel along the route. The method may continue to point A (e.g. operation 608) of the flowchart depicted in FIG. 18 or to operation 530 receiving an indication of a change to the safe route from the user interface. At operation 532, the method may also include updating the route based on the indication of the change to the safe route, the method may return to operation 518.

The method depicted in FIGS. 18 and 19 may include receiving an indication of a desire to modify the route at operation 604, displaying a plurality of route snippets at operation 606, and receiving user input indicating selection of a route snippet at operation 608. The method may also include receiving user input indicating a selected portion of the selected route snippet in connection with a point along the route at operation 632, causing the route snippet to be displayed at the selected position at operation 634, and causing modification of the route such that the route snippet is activated and the portion of the route following the point deactivated at operation 642 (see FIG. 19).

In some embodiments, the method may include additional, optional operations, and/or the operations described above may be modified or augmented. Some examples of modifications, optional operations, and augmentations are described below, as indicated by dashed lines, such as, causing a route to be displayed on a user interface at operation 602, receiving an indication of a new route snippet from a user interface at operation 610, and causing the new route snippet to be stored in memory at operation 612. The method may also include receiving an indication of a change in scale associated with the route snippet at operation 614, causing the scale of the route snippet to change scale relative to the route based on the indication of change in scale at operation 616, receiving an indication of a rotation associated with the route snippet at operation 618, and causing the route snippet to rotate relative to the route based on the indication of rotation at operation 620. The method may optionally include receiving an indication of a change of position of a waypoint associated with the route snippet at operation 622 and causing the waypoint associated with the route snippet to change position based on the indication of change at operation 624. The method may continue from operations 616, 620, or 624 to point B of FIG. 19. The method may also include receiving an indication of the route snippet being within a predetermined distance of the route at operation 626, receiving an indication of the route snippet being within a predetermined distance of the route at operation 628 and causing an indication of a snap position indicative of a current position on the route the route at operation 630. In some example embodiments, the method may include comparing the route snippet displayed at the selected position to one or more navigational thresholds at operation 636, modifying the route snippet to generate a safe route snippet at operation 638, and receiving an indication of route snippet activation from the user interface at operation 640. In some example embodiments the method may continue at point C, e.g. operation 528, of FIG. 17.

FIGS. 17-19 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A marine electronic device comprising:
a user interface comprising a touch screen;
a processor; and
a memory having computer program code stored thereon, the memory and the computer program code configured to, with the processor, cause the marine electronic device to:
cause a chart to be displayed on the touch screen;
receive, via the touch screen, user input defining a continuous touch pattern directed to the chart, wherein the touch pattern defines a starting point, an ending point, and a drawn route between the starting point and the ending point;
determine one or more geographic locations on the chart that each correspond to one or more points along the touch pattern including a starting location that corresponds to the starting point and an ending location that corresponds to the ending point;
determine a distance between the starting location and the ending location; and
in an instance in which the distance between the starting location and the ending location is within a completion threshold, generate a continuous route comprising at least the starting location and one or more other determined geographic locations on the chart corresponding to one or more points along the touch pattern, wherein the continuous route is generated by shifting the ending location to match the starting location, wherein the continuous route defines a travel path that does not end such that a watercraft navigating along the travel path would return to the starting location and continue navigating along the travel path again.

2. The marine electronic device of claim 1, wherein the memory and the computer program code are further configured to, with the processor, cause the marine electronic device to:
receive, via the user interface, an indication to activate the route; and
send, to an autopilot for a maneuvering system of a watercraft including the marine electronic device, instructions to cause the autopilot to operate the maneuvering system such that the watercraft travels along the route.

3. The marine electronic device of claim 1, wherein the memory and the computer program code are further configured to cause the marine electronic device to:
generate the route between a plurality of waypoints, wherein each waypoint corresponds to a determined geographic location that corresponds to a point along the touch pattern.

4. The marine electronic device of claim 1, wherein the memory and the computer program code are further configured to, with the processor, cause the marine electronic device to:
compare the route to one or more predetermined navigational thresholds, wherein the navigational threshold is based on a speed of a vessel and turn radius associated with the speed of the vessel; and
modify at least a portion of the route to generate a safe route which satisfies the predetermined navigational thresholds such that the route will not exceed a minimum safe turn radius.

5. The marine electronic device of claim 4, wherein the safe route comprises a plurality of waypoints and course headings, and
wherein the distance between two consecutive waypoints of the plurality of waypoints is based on predetermined navigation thresholds.

6. The marine electronic device of claim 1, wherein the memory and the computer program code are further configured to, with the processor, cause the marine electronic device to:
compare the route to one or more predetermined navigational thresholds, wherein the one or more navigational thresholds are based at least on one of obstacles, depth, and land; and
modify at least a portion of the route to generate a safe route which satisfies the predetermined navigational thresholds such that a vessel avoids marine hazards along the route.

7. The marine electronic device of claim 1, wherein the memory and the computer program code are further configured to, with the processor, cause the marine electronic device to:
compare at least a portion of the route to a plurality of stored route patterns; and
update the portion of the route to reflect at least one of the plurality of stored route patterns in an instance in which the portion of the route matches the one of the plurality of stored route patterns within a route pattern threshold.

8. The marine electronic device of claim 1, wherein the memory and the computer program code are further configured to, with the processor, cause the electronic navigation device to:
receive a repeat route indication; and
cause the route to repeat for at least a plurality of cycles.

9. The marine electronic device of claim 1, wherein the memory and the computer program code are further configured to, with the processor, cause the electronic navigation device to:
receive an indication of a change to the route; and
update the route based on the indication of the change to the route.

10. The marine electronic device of claim 1, wherein the indication of a change to the route comprises:
receiving an indication of a selected route snippet;
receiving an indication of a selected portion on the generated route;
causing the route snippet to replace the selected portion; and
causing the route snippet to be activated and the selected portion to be deactivated.

11. The marine electronic device of claim 10, wherein the route snippet is activated in response to an indication of route snippet activation from the user interface.

12. A computer program product comprising a non-transitory computer readable medium including computer program code configured to, with a processor, cause a marine electronic device to:

cause a chart to be displayed on a touch screen of a user interface;

receive, via the touch screen, user input defining a continuous touch pattern directed to the chart, wherein the touch pattern defines a starting point, an ending point, and a drawn route between the starting point and the ending point;

determine one or more geographic locations on the chart that each correspond to one or more points along the touch pattern including a starting location that corresponds to the starting point and an ending location that corresponds to the ending point;

determine a distance between the starting location and the ending location; and in an instance in which the distance between the starting location and the ending location is within a completion threshold, generate a continuous route comprising at least the starting location and one or more other determined geographic locations on the chart corresponding to one or more points along the touch pattern, wherein the continuous route is generated by shifting the ending location to match the starting location, wherein the continuous route defines a travel path that does not end such that a watercraft navigating along the travel path would return to the starting location and continue navigating along the travel path again.

13. The computer program product of claim 12, wherein the computer program code is further configured to cause the marine electronic device to:

receive, via a user interface, an indication to activate the route; and send, to an autopilot for a maneuvering system of a watercraft including the marine electronic device, instructions to cause the autopilot to operate the maneuvering system such that the watercraft travels along the route.

14. A method comprising:

causing a chart to be displayed on a touch screen of a user interface;

receiving, via the touch screen, user input defining a touch pattern directed to the chart, wherein the touch pattern defines a starting point, an ending point, and a drawn route between the starting point and the ending point;

determining one or more geographic locations on the chart that each correspond to one or more points along the touch pattern including a starting location that corresponds to the starting point and an ending location that corresponds to the ending point;

determining a distance between the starting location and the ending location; and in an instance in which the distance between the starting location and the ending location is within a completion threshold, generating a continuous route comprising at least the starting location and one or more other determined geographic locations on the chart corresponding to one or more points along the touch pattern, wherein the continuous route is generated by shifting the ending location to match the starting location, wherein the continuous route defines a travel path that does not end such that a watercraft navigating along the travel path would return to the starting location and continue navigating along the travel path again.

* * * * *